(12) United States Patent
Johnson

(10) Patent No.: US 10,557,740 B2
(45) Date of Patent: Feb. 11, 2020

(54) BIN LEVEL INDICATOR

(71) Applicant: Thomas C. Johnson, Roseau, MN (US)

(72) Inventor: Thomas C. Johnson, Roseau, MN (US)

(73) Assignee: LTJ ENTERPRISES, INC, Roseau, MN (US)

( * ) Notice: Subject to any disclaimer, the term of this patent is extended or adjusted under 35 U.S.C. 154(b) by 4 days.

(21) Appl. No.: 15/996,159

(22) Filed: Jun. 1, 2018

(65) Prior Publication Data

US 2019/0017859 A1      Jan. 17, 2019

Related U.S. Application Data

(60) Provisional application No. 62/532,613, filed on Jul. 14, 2017.

(51) Int. Cl.
| | | |
|---|---|---|
| *G01F 23/00* | (2006.01) | |
| *E04H 7/22* | (2006.01) | |
| *G01F 23/02* | (2006.01) | |
| *B65D 90/48* | (2006.01) | |

(52) U.S. Cl.
CPC ........... *G01F 23/0007* (2013.01); *E04H 7/22* (2013.01); *B65D 90/48* (2013.01); *B65D 2590/0091* (2013.01); *G01F 23/003* (2013.01); *G01F 23/02* (2013.01)

(58) Field of Classification Search
CPC ....... G01F 23/02; G01F 23/003; B65D 90/48; B65D 2590/0091; E04H 7/22
See application file for complete search history.

(56) References Cited

U.S. PATENT DOCUMENTS

| | | | | |
|---|---|---|---|---|
| 910,606 A | | 1/1909 | Swanson | |
| 2,260,661 A | | 10/1941 | Enderud | |
| 2,570,952 A | * | 10/1951 | Hyland | A01C 15/006 |
| | | | | 116/215 |
| 2,571,378 A | * | 10/1951 | Parisi | G01F 23/0007 |
| | | | | 340/615 |
| 2,698,362 A | * | 12/1954 | Bozich | G01F 23/226 |
| | | | | 200/61.21 |
| 2,718,867 A | | 9/1955 | Ray | |
| 2,851,553 A | * | 9/1958 | Grostick | G01F 23/226 |
| | | | | 200/61.21 |

(Continued)

*Primary Examiner* — Nimeshkumar D Patel
*Assistant Examiner* — Tania Courson
(74) *Attorney, Agent, or Firm* — Richard John Bartz

(57) ABSTRACT

A bulk material storage bin has an upright wall supporting a plurality of vertically spaced indicators providing a person with visual information regarding the level of the bulk material in the bin. The indicators have bright color and dark color surfaces that are selectively displayed to provide a person with information of the level of bulk material in the bin. An actuator located in the bin cooperates with a motion transmission apparatus to move visual members to an ON position displaying the bright color when the bulk material engages the actuator and to an OFF position displaying the dark color when the actuator is free of bulk material. The motion transmission apparatus includes a rod movably retained on an O-ring held on a mount device secured to the side wall of the bin. A yoke supporting an endless flexible member mounted on the rod is connected to the visual members whereby movement of the rod moves the visual members between the ON and OFF positions.

22 Claims, 17 Drawing Sheets

(56) References Cited

U.S. PATENT DOCUMENTS

| | | | |
|---|---|---|---|
| 3,210,493 A | | 10/1965 | Lau |
| 3,290,462 A | | 12/1966 | Watkins |
| 3,583,221 A | * | 6/1971 | Ehrenfried .............. G01F 23/18 |
| | | | 73/301 |
| 3,685,356 A | | 8/1972 | Zimmerman |
| 4,211,966 A | * | 7/1980 | Sweet ................... H01H 35/18 |
| | | | 200/61.21 |
| 4,576,107 A | * | 3/1986 | Brasher .................. G01F 23/00 |
| | | | 116/227 |
| 4,799,383 A | | 1/1989 | Johnson et al. |
| 4,829,820 A | | 5/1989 | Johnson et al. |
| 5,088,323 A | | 2/1992 | Johnson et al. |
| 5,657,716 A | * | 8/1997 | Beasley ............. B65G 69/2876 |
| | | | 116/215 |
| 6,067,927 A | | 5/2000 | Johnson et al. |
| 6,111,211 A | * | 8/2000 | Dziedzic ............. G01F 23/0007 |
| | | | 200/61.2 |
| 6,272,818 B1 | * | 8/2001 | Sebben .............. A01D 43/0631 |
| | | | 56/10.2 R |
| 9,383,243 B1 | * | 7/2016 | Schaefer ............... G01F 23/003 |
| D848,874 S | * | 5/2019 | Johnson .......................... D10/69 |
| 2016/0216147 A1 | | 7/2016 | Johnson |

* cited by examiner

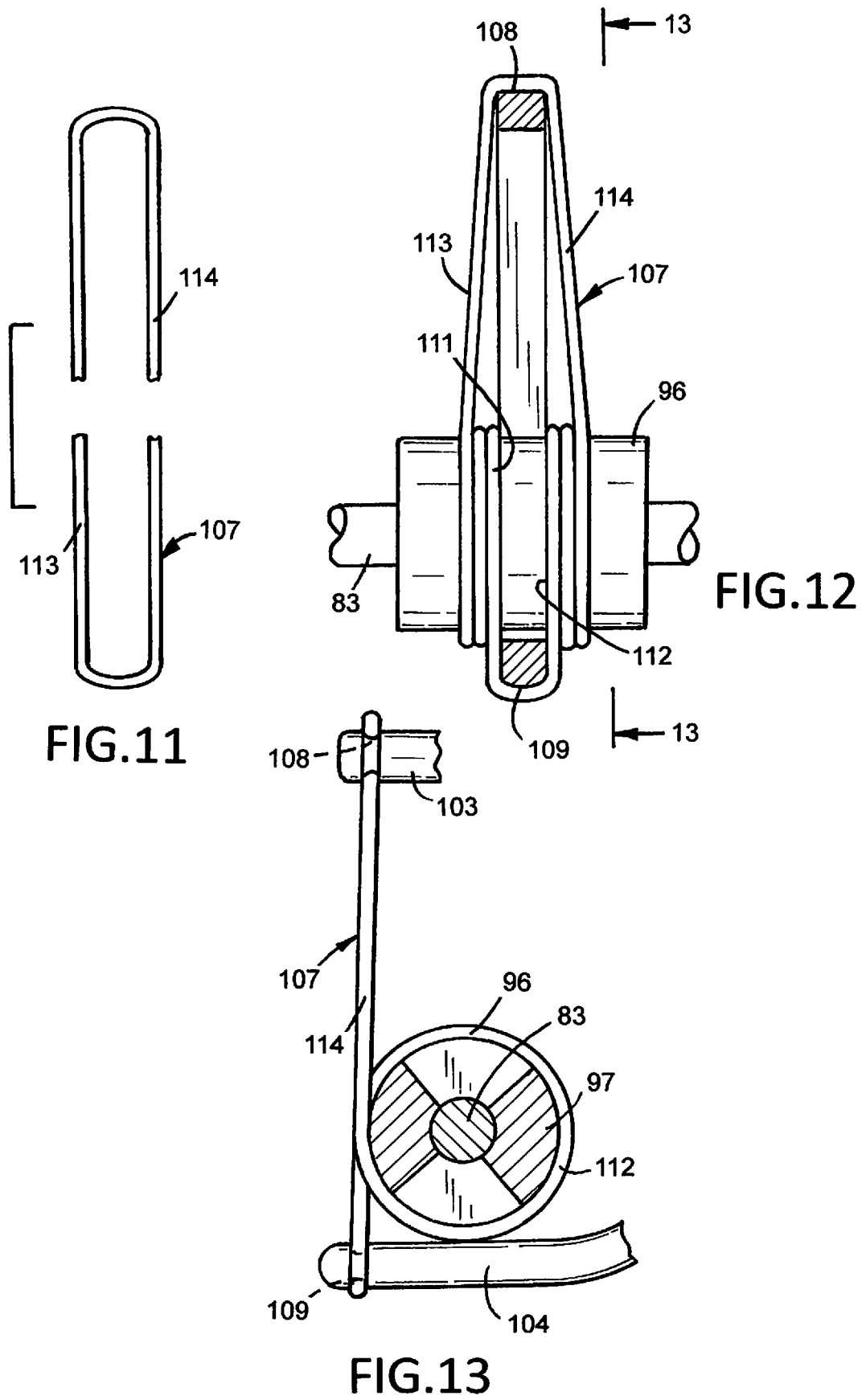

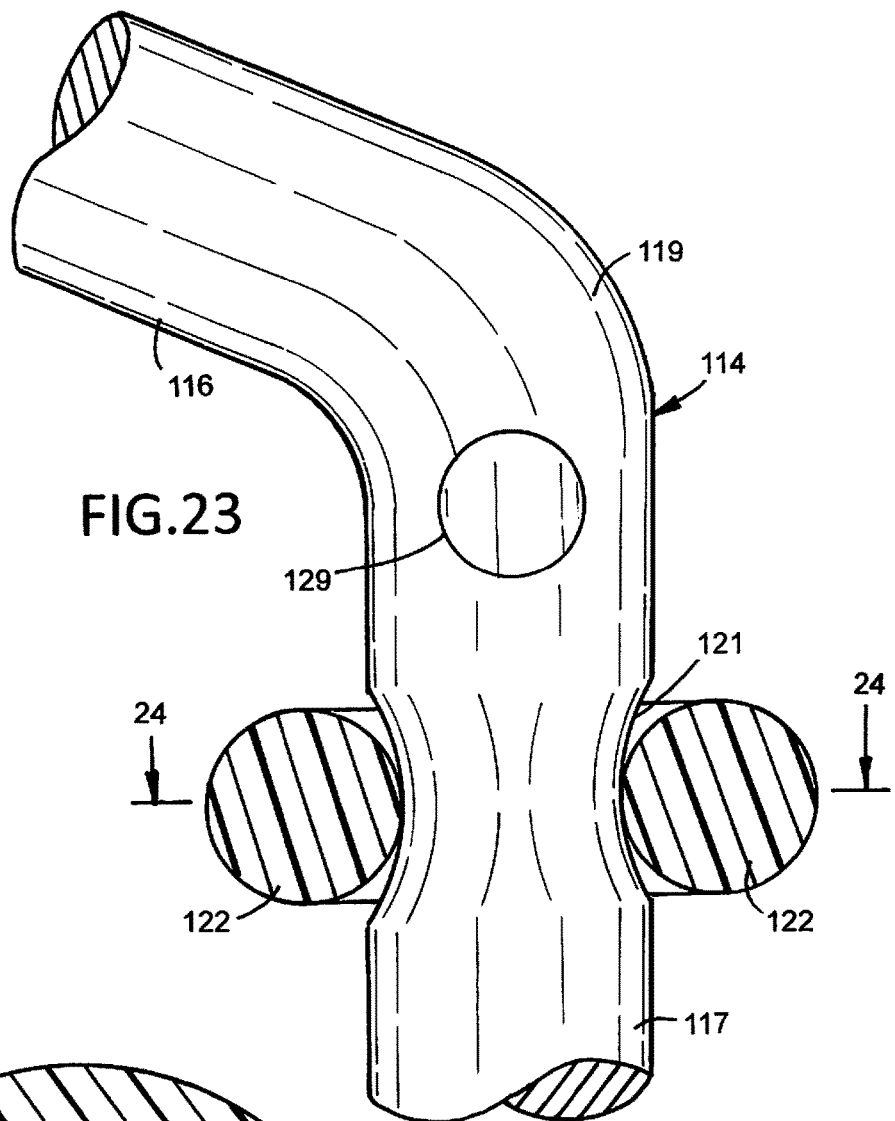
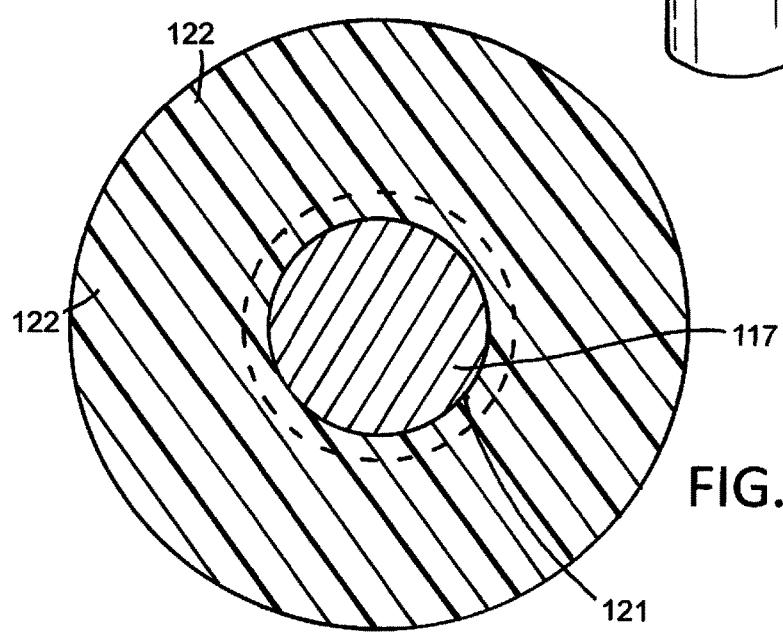

BIN LEVEL INDICATOR

CROSS REFERENCE TO RELATED APPLICATION

This application claims the priority of U.S. Provisional Patent Application Ser. No. 62/532,613 filed Jul. 14, 2017.

FIELD OF THE INVENTION

The invention relates to technology of visual information concerning the amount of and level of material stored in a bin. The visual information is derived from one or more visual indicators having actuators responsive to the material in the bin to control visual members to display light color or dark color information to a person viewing the bin.

BACKGROUND OF THE INVENTION

Material storage structures and bins have been provided with visual indicators to provide a person with information concerning the level and amount of material located in the structures and bins. Examples of visual indicators attached to bins to provide visual information regarding the level of material stored in the bins are shown and described in the following U.S. patents.

P. Swanson in U.S. Pat. No. 910,606 discloses a coal bin having vertically spaced visual indicators along an upright wall of the bin. Each indicator has a plate pivotally supported on the inside of the upright wall and a pair of plates hinged to the outside of the upright wall. A rod extended through a hole in the upright wall is pivotally connected to the plates. Coal in the bin forces the inside plate against the upright wall and moves the outside plate to an upright position. A person standing adjacent the bin can look at the upright plate to ascertain whether it is loaded, empty or partially filled up with coal.

A. Enderud in U.S. Pat. No. 2,260,661 discloses a gauge for indicating the level of seed grain in a seed box. A shaft rotatably mounted on the seed box is connected to a scale located adjacent the outside of the seed box. An arm is joined to the inside end of the shaft. The lower end of the arm supports a rider or float. The rider moves up and down with the level of seed grain in the seed box causing the indicator of the gauge to move thereby providing a visual indication of the level of seed grain in the seed box.

J. Ray in U.S. Pat. No. 2,718,867 discloses a material level indicator for a bin. A bin wall has an opening covered with a mounting plate. Brackets secured to the mounting plate pivotally support a visual flag for movement between vertical and horizontal positions. An inverted V-shaped member secured to the plate extends horizontally into the chamber of the bin. An arm pivotally mounted on the member extended downwardly is attached to a paddle adapted to contact the material in the bin. A linkage connected to the arm and flag transmits pivotal movement of the arm to pivot the flag between the vertical and horizontal positions that provide visual information regarding the level of the material in the bin.

E. Lau in U.S. Pat. No. 3,210,493 discloses a bin level sensing device having a sensing arm pivotally mounted with a spherical bearing on a housing. A ball is attached to the outer end of the arm. A motor operates to move the arm and ball in a circular path. When ball engages material in the bin, the motor stalls and closes a microswitch thereby providing information relative to the level of material in the bin.

L. Watkins in U.S. Pat. No. 3,290,462 discloses a bin level switch operable to control an alarm signal or relays to shut off the feed of coal to a bin. A rigid rod connected to a coupling having a spherical head extended down into the bin engages the coal in the bin. A shield attached to the rod protects the rod from the impact of lumps of coal rolling down in the bin. An arm connected to the coupling has an upper end engageable with an actuator of an electric switch. When the level of the coal in the bin moves the rod laterally, the arm swings away from the switch actuator whereby the switch is turned on activating the alarm.

R. Zimmerman in U.S. Pat. No. 3,685,356 discloses a level indicator for granular material being discharged in a bin. The indicator has a feeler arm arranged to sit on the side of a conical pile of granular material in the bin. A mechanical linkage including a shaft and arms transmit motion to a useable mechanical or electrical signal used for the detection, indication and/or control of the level of the pile of granular material in the bin.

T. Johnson and L. Johnson in U.S. Pat. No. 4,799,383 disclose a visual indicator for providing a positive visual indication of the level of grain in a bin. The indicator has a sealed chamber filled with an opaque liquid. A contrasting plug secured to a diaphragm is movable in response to an actuator located in the bin between an OFF position obscured by the liquid and an ON position wherein the plug is visible upon displacement of the liquid. The actuator includes a resilient dome that collapses in response to pressure of the grain in the bin.

L. Johnson and T. Johnson in U.S. Pat. No. 4,829,820 disclose a visual indicator operable to provide positive ON and OFF visual information to a person of the level of grain in a bin. This indicator has the opaque liquid and plug disclosed in U.S. Pat. No. 4,799,383. The actuator has an arm pivoted to a housing. A pressure plate secured to the bottom of the arm is moved by the pressure of grain in the bin whereby the arm applies a force to a stem operatively connected to the plug to move the plug between an OFF position obscured by the liquid and an ON position wherein the plug is visible upon displacement of the liquid. A spring biases the plug and arm to the OFF position.

L. Johnson and T. Johnson in U.S. Pat. No. 5,088,323 disclose a visual indicator having an actuator connected to a mounting bracket. The bracket and actuator extends through a hole in the side wall of a bin. Part of the bracket and actuator is moved from the outside of the bin wall through the hole to the inside of the bin. The actuator has a lever pivotally mounted on the bracket and pressure plates connected to the lever. A bag attached to the bracket surrounds the pressure plates. The presence of grain in the bin causes the bag to collapse whereby the entire force acting on the bag is transmitted to the pressure plates to activate the visual indicator. An alternative actuator has a triangle-shaped collapsible plate connected to a force transmitting cup and a motion restriction washer. A bolt and threaded insert connects the pressure plate 290 to the washer and cup.

L. Johnson and T. Johnson in U.S. Pat. No. 6,067,927 disclose a visual indicator secured to the side wall of a material storage bin that operates to provide a person with visual information concerning the level of materials in the bin. The indicator has a body supporting rotatable visual members having contrasting colored portions covered with a transparent lens. An arm pivotally mounted on the body operates a motion transmission gear assembly that selectively rotates the visual members between ON and OFF positions. An actuator responsive to the material in the bin is operatively connected to the arm to pivot the arm to cause the motion transmission gear assembly to rotate the visual members between ON and OFF positions thereby providing visual information of the level of material in the bin.

SUMMARY OF THE INVENTION

The indicator is operable in response to the level of material in a bin to provide a person remote from the bin with information as to the level of the material in the bin. The information is displayed as visual bright or dark colors, such as yellow and black, that are viewable by the person. A number of indicators are vertically spaced on the side wall of the bin to provide the person with information as to the level of material from empty, partly full to full. The indicator is adapted to detect the level of any material ranging from powders to pellets including agricultural grains, feeds, plastic pellets, fertilizers, salt, minerals and sand. The indicator comprises an actuator, at least one visual member and a motion transmission apparatus operatively connecting the actuator with the visual member. The actuator located within the bin is moved by material in the bin from a first position to a second position adjacent the inside of the upright wall of the bin. The actuator moves the motion transmission apparatus which in turn moves the visual member to display either a bright color, such as yellow, orange or green, or a dark color, such as black or grey. The bright color display provides visual information that the level of the material in the bin is at or above the location of the indicator on the side wall of the bin. The dark color display provides visual information that the level of the material in the bin is below the location of the indicator on the side wall of the bin.

The indicator has a housing with an internal chamber closed with a light transparent member or lens. One or more visual members located in the internal chamber are movably supported on the housing for movement relative to the transparent lens to show either the bright color display or the dark color display. An actuator including a flexible body and a mount device having an elongated bar are located within the bin and a center boss adapted to extend through a hole in an upright sidewall of the bin. The body of the actuator secured to the elongated bar extends downward from the bar into the bin chamber. A fastener threaded onto the boss cooperates with the side wall of the bin to hold the bar against the side wall of the bin. The actuator has a generally flat and flexible body of sheet material with an upper portion attached to the bar. The body has a semi-conical shape that extends downwardly into the bin. The back of the body has a vertical tubular sleeve accommodating a rod to connect the actuator to a yoke operable to rotate the visual members between dark and light color positions. A motion transmission apparatus movably mounted on the boss transmits angular movements of the actuator body to rotational movement of the visual members to show either the bright color display or dark color display. The motion transmission apparatus includes a rod having linear first and second rod sections joined with a neck in a generally right angle orientation. A yoke slidably mounted on the first arm supports an endless flexible member. The flexible member is trained or wound around a cylindrical sleeve drivably connected to the visual members. The second rod section is located within the tubular sleeve of the actuator body. The second rod section adjacent the neck has a reduced diameter section providing an annular recess. A torus or O-ring located around the annular recess is in sealing engagement with the reduced diameter section of the second rod section. The O-ring rests in an annular pocket surrounding an opening in a bottom portion of the boss. A plate retained in the boss holds the O-ring in the pocket. The O-ring supports the rod on the boss of the mount device and allows the rod to angularly move relative to the boss. The O-ring also seals the opening in the boss to prevent dust, dirt and particulate materials from moving from the bin chamber into the indicator housing.

DESCRIPTION OF THE DRAWING

FIG. 11 is a foreshortened elevational view of the endless filament of the motion transmitting mechanism for rotating the visual members of the material level indicator between the light ON and dark OFF positions;

FIG. 12 is an enlarged sectional view taken along line 12-12 of FIG. 8;

FIG. 13 is a sectional view taken along line 13-13 of FIG. 12;

FIG. 23 is an enlarged sectional view taken along line 23-23 of FIG. 22;

FIG. 24 is a sectional view taken along line 24-24 of FIG. 23;

DESCRIPTION OF THE INVENTION

Figure 1:
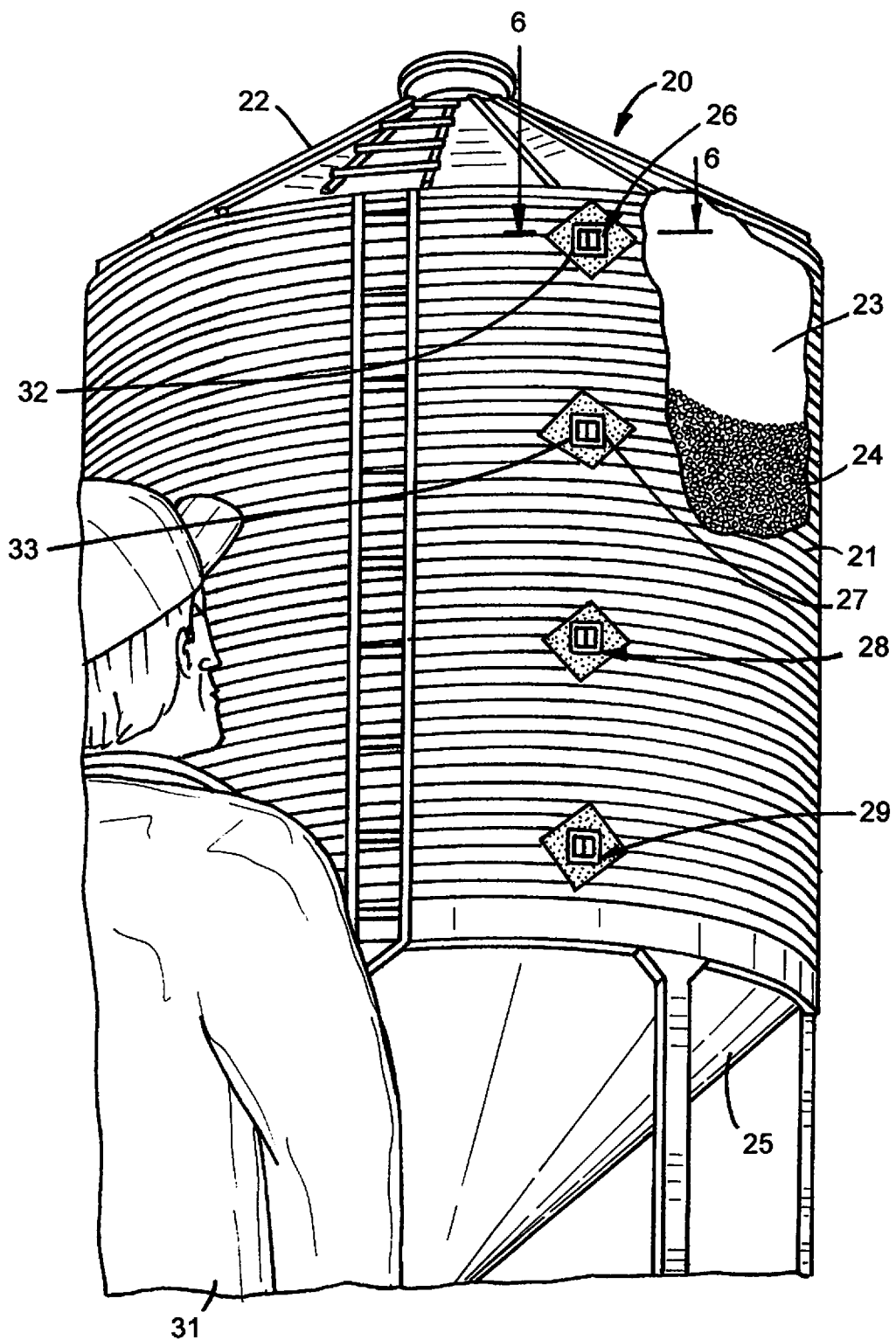
FIG. 1 is a perspective view of a material storage bin having material level indicators of the invention mounted on the side wall of the bin.

A material storage bin 20, shown in FIG. 1, is a conventional grain bin having a cylindrical upright side wall 21 supporting a roof 22. Side wall 21 surrounds an interior chamber or compartment 23 for storing materials 24. The materials include grain, animal feed, granular fertilizer, plastic pellets, minerals, cement powers and sand. These and other particulate materials are herein identified as materials. The amount of the materials 24 stored in chamber 23 can vary from a full chamber to an empty chamber. Management of the stored materials requires information as to the amount of materials in the chamber of the bin. The top surface of the materials along with the vertical height and size of the chamber determines the volume of materials in the chamber 23 of the bin 20.

Visual indicators 26, 27, 28 and 29 mounted on side wall 21 at vertically spaced positions provide a person 31 remote from the bin with visual information of the presence of materials at selected levels or vertical positions in chamber 23. Each indicator 26-29 provides positive YES or negative NO visual information of the presence of material adjacent the indicator. Indicator 26 is in its dark color negative NO position which provides negative visual information that the level of the material is below indicator 26. Indicator 27 is in its light color positive YES position which provides positive visual information that the level of the material is at or above indicator 27.

Figure 2:
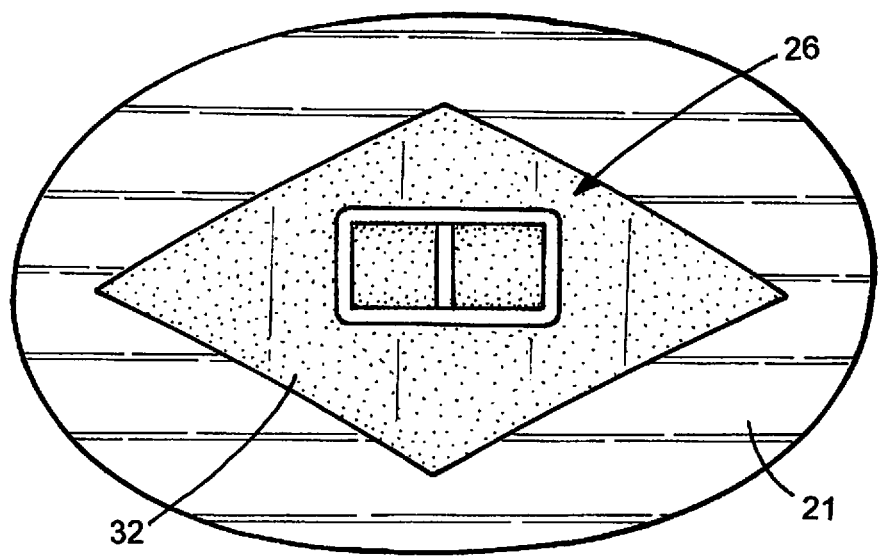
FIG. 2 is an enlarged front view of the material level indicator on the side wall of the bin showing the visual members in the dark or no material level position of material in the bin.
Figure 3:
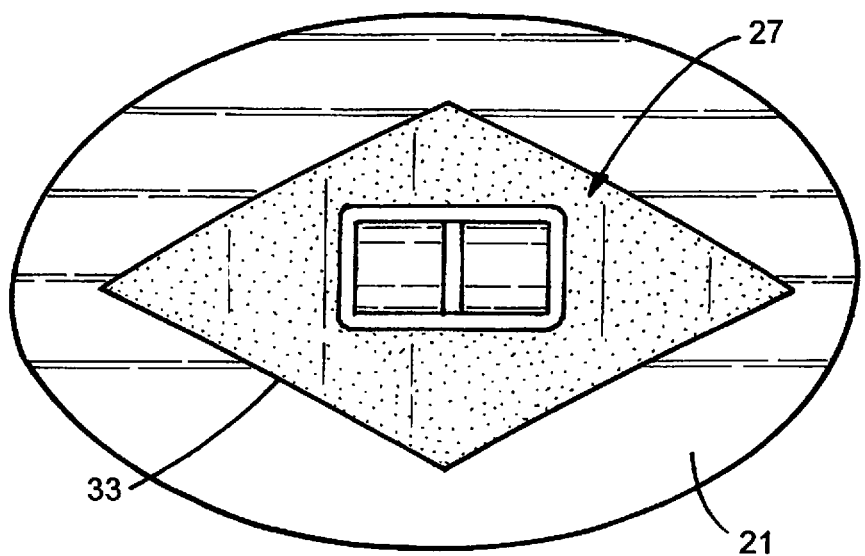
FIG. 3 is an enlarged front view of the material level indicator on the side wall of the bin showing the visual members in the light or material level position of material in the bin.

As shown in FIG. 2, indicator 26 is superimposed on a diamond-shaped black color member 32. When indicator 26 is in the dark color or negative NO position, it visually blends in with the black color member 32. Member 32 has an equilateral quadrilateral shape. Other shapes including round, triangular and rectangular can be used for member 32. Member 32 is a decal attached with an adhesive to the outside of side wall 21. Indicator 27 is also superimposed on a diamond-shaped black member 33. When indicator 27 is in the light or positive YES visual position, it provides a light color contrast with the black color member 33 which visually stands out and is readily observed by the person 31. Member 33 has the same size and shape as member 32.

Figure 4:
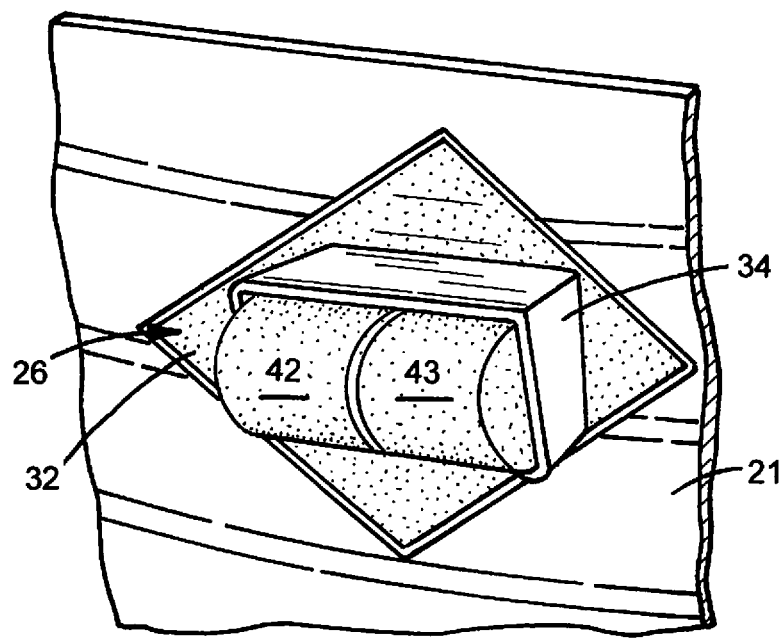
FIG. 4 is a perspective view of the material level indicator mounted on the side wall of the bin.
Figure 5:
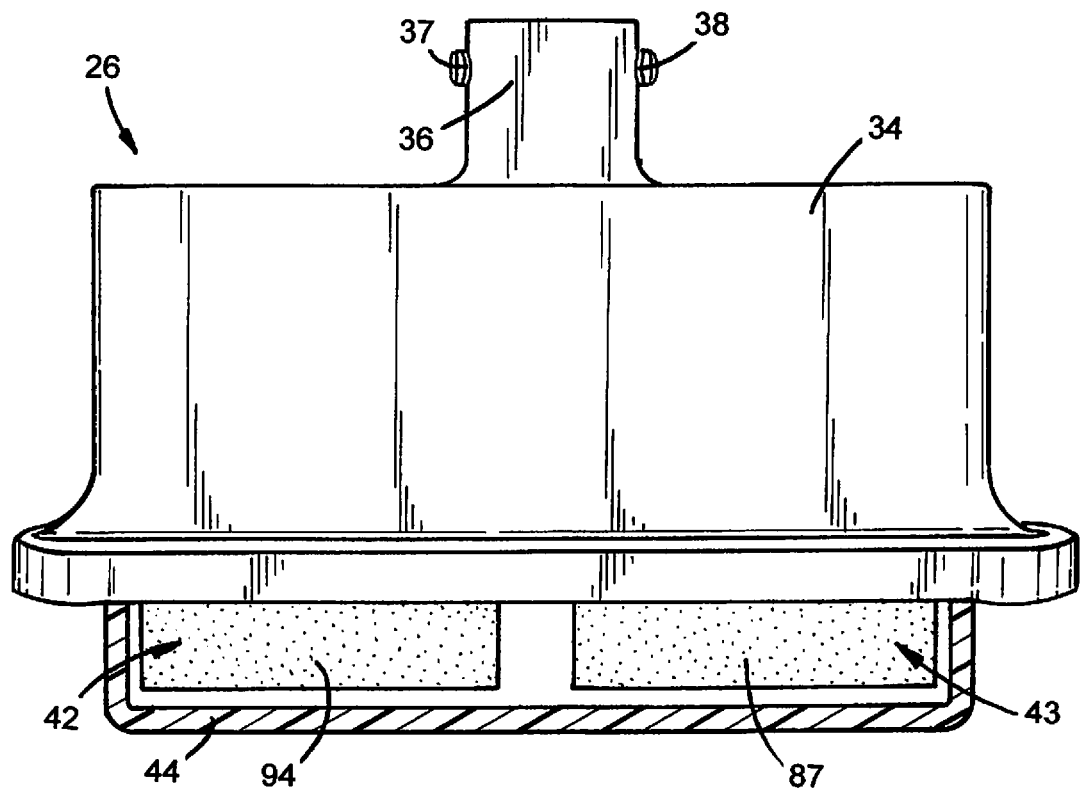
FIG. 5 is a top view of the housing partly sectioned and the visual members of the material level indicator.
Figure 7:
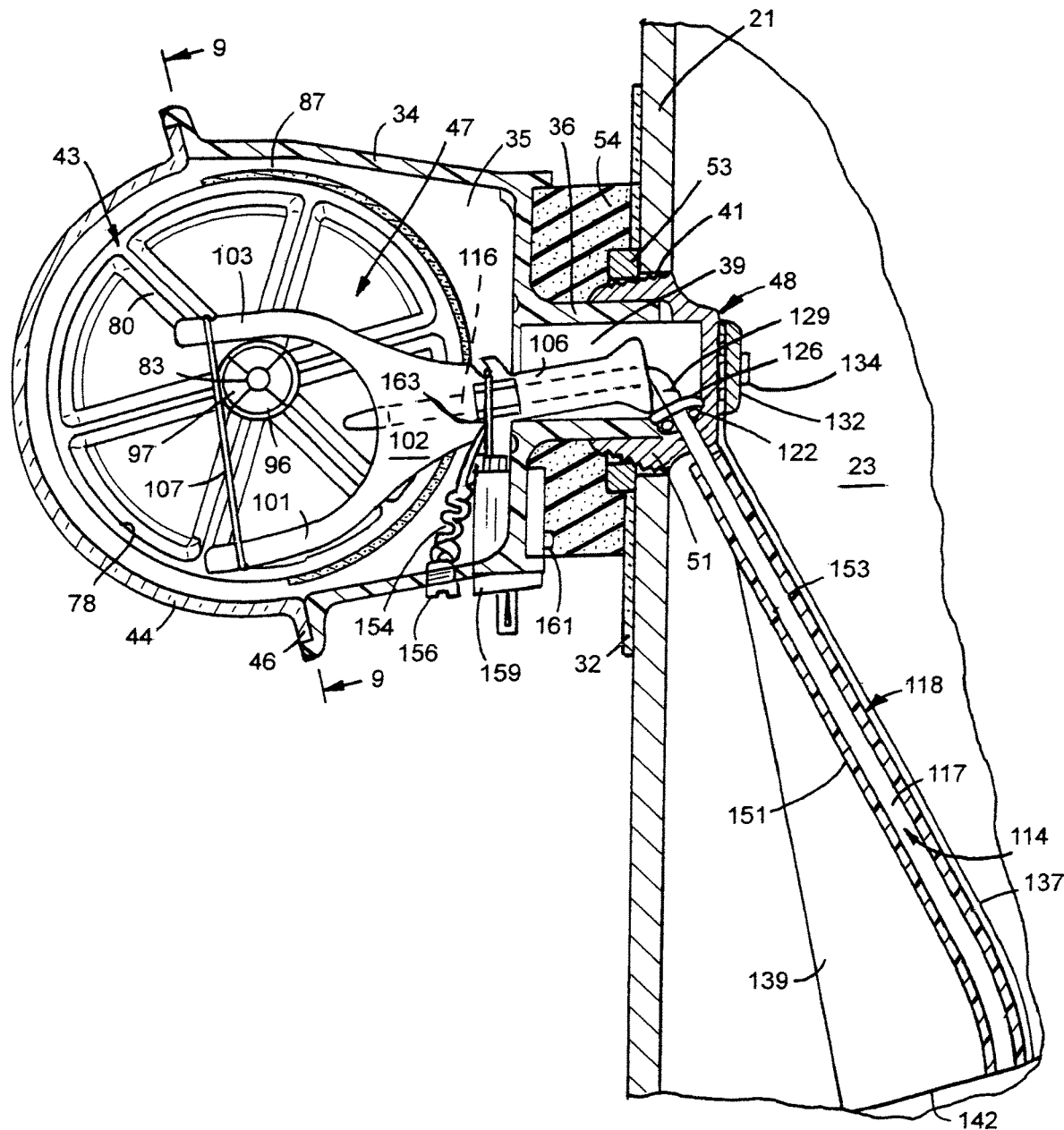
FIG. 7 is a sectional view taken along line 7-7 of FIG. 6 showing the visual members in the dark OFF positions.
Figure 8:
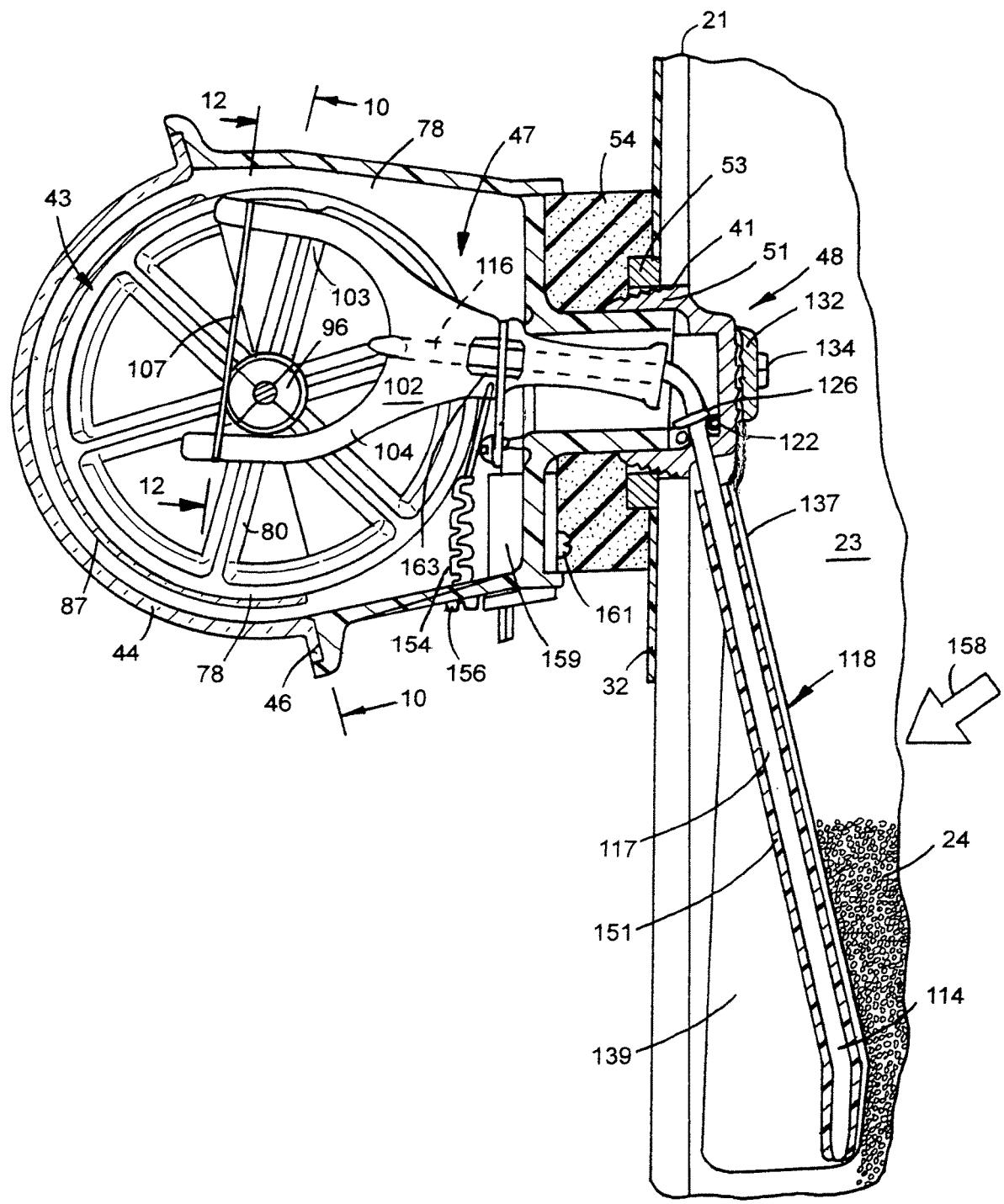
FIG. 8 is a sectional view of FIG. 7 showing the visual members in the light ON positions.

Material level indicator 26, shown in FIGS. 4 and 5, has a housing 34 with a rearward extended tubular member or projection 36. A passage 39 of projection 36 is open to interior chamber 35 of housing 34. Outward directed pegs or bosses 37 and 38 are joined to opposite sides of projection 36. Projection 36 and bosses 37 and 38 function to mount housing 34 on side wall 21 of bin 20 as hereinafter described. Supports can be used to attach housing 34 to side wall 20 of bin 20. A pair of visual members 42 and 43 rotatably mounted on housing 34 are located behind semi-cylindrical light transparent member or lens 44. Lens 44 is a light transparent plastic body secured to housing 34 with sonic welds, as shown in FIGS. 7 and 8. Lens 44 also closes the open portion of chamber 35 to isolate the visual members 42 and 43 and motion transmitting apparatus 47 from the external environment. A single visual member can be rotatably mounted on housing 34 as an alternative to visual members 42 and 43.

Figure 6:
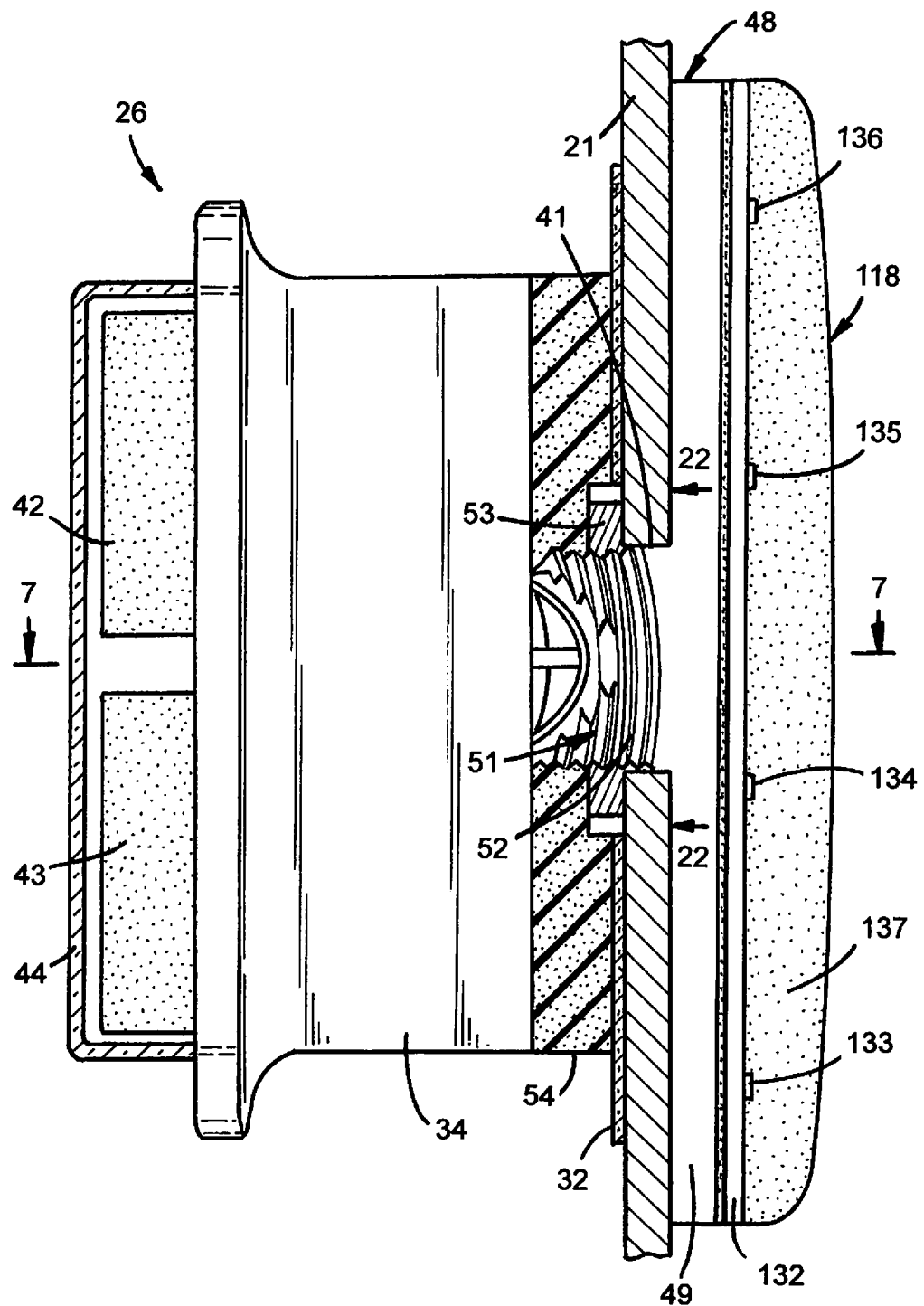
FIG. 6 is an enlarged sectional view taken along line 6-6 of FIG. 1.

Proceeding to FIGS. 6, 7 and 8, side wall 21 has an opening or cylindrical hole 41 open to interior chamber 23 of bin 20. A mount device 48 has a transverse bar 49 and a sleeve or boss 51 having external threads 52. Boss 51 extends through hole 41 when bar 49 engages the inside surface of side wall 21 of bin 20. A nut 53 threaded on boss 51 retains boss 51 and bar 49 on side wall 21 of bin 20. External threads 52 on boss 51 accommodate nut 52 to fix mount device 48 on side wall 21 of bin 20. A pad 54, of sealing material, such as closed cell plastic, interposed between the back of housing 34 and around boss 51 prevents water, snow, dirt, insects and air from flowing through hole 41 into interior chamber 23 of bin 20.

Figure 16:
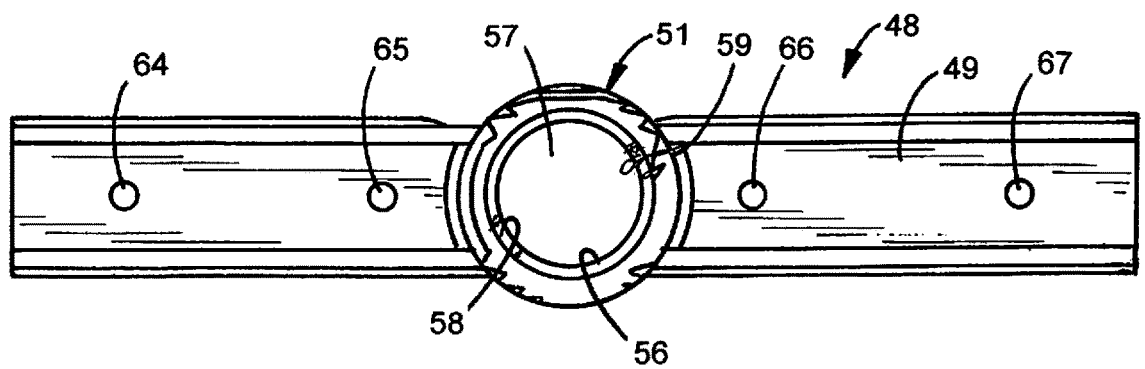
FIG. 16 is a front elevational view of the combined wall mount and actuator holder of the material level indicator.
Figure 18:
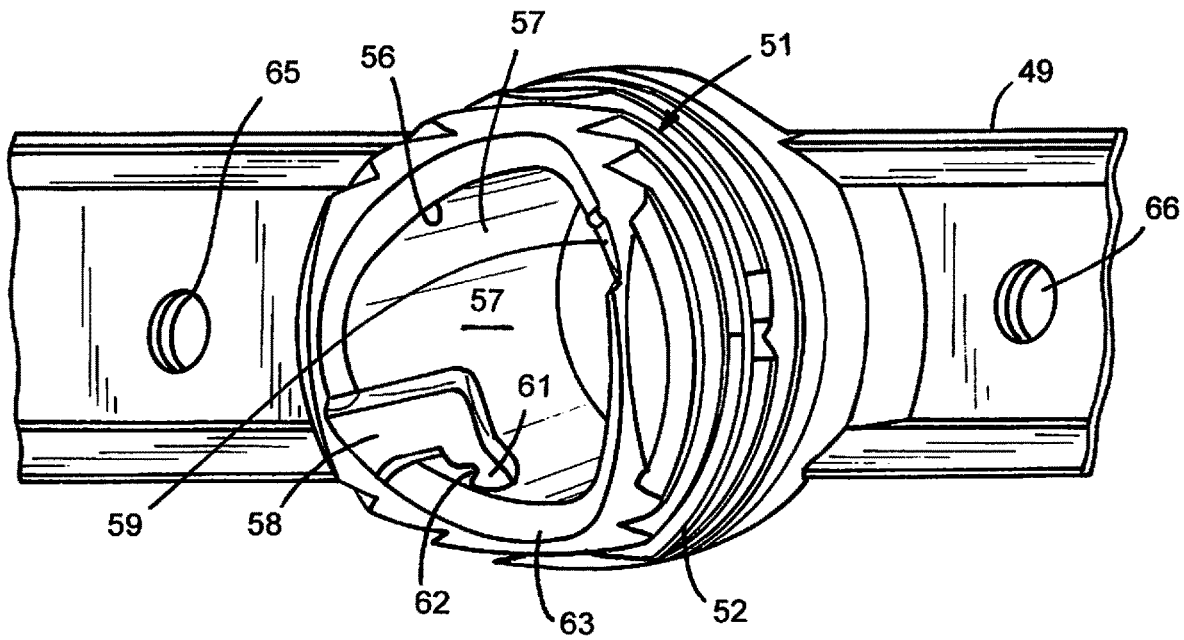
FIG. 18 is an enlarged perspective view of the wall mount of the material level indicator.
Figure 19:
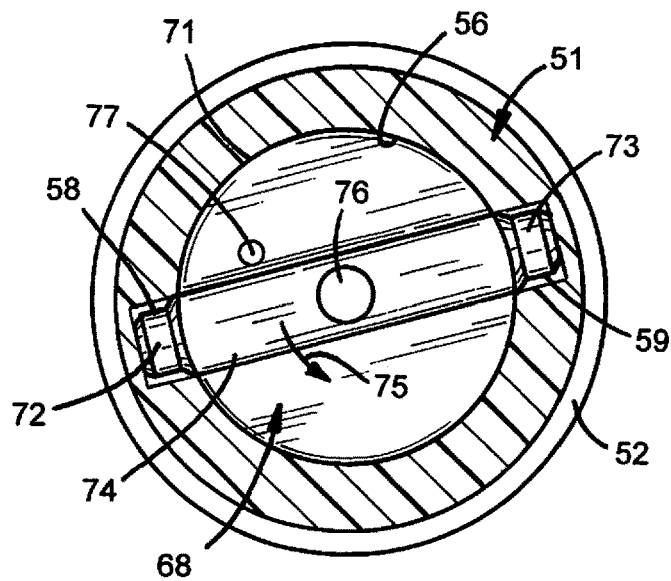
FIG. 19 is an elevational view partly sectioned of the wall mount of FIG. 18 with the plug used to mount the material level indicator on the wall of the material storage bin.

As shown in FIGS. 16, 18 and 19, boss 51 has a cylindrical inside wall 56 surrounding a passage or opening 57. Inside wall 56 has grooves 58 and 59 extended in axial directions on opposite sides of wall 56. Groove 58, shown in FIG. 18, is open to a circumferentially extended pocket 61. A detent projection extended into pocket 61 is a retainer as described hereinafter. Groove 59 is also open to a pocket including a detent projection as illustrated in FIG. 18. Grooves 58 and 59 are open to the front end 63 of boss 51. Bar 49 has longitudinally spaced holes 64, 65, 66 and 67.

Figure 20:
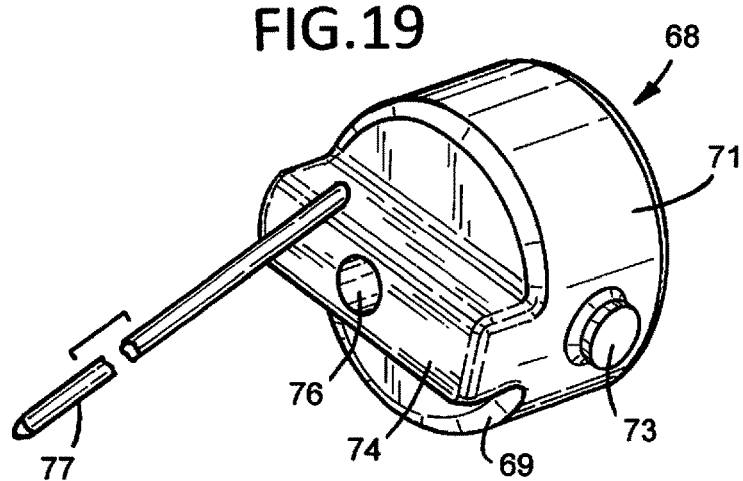
FIG. 20 is a perspective view of the plug of FIG. 19.
Figure 21:
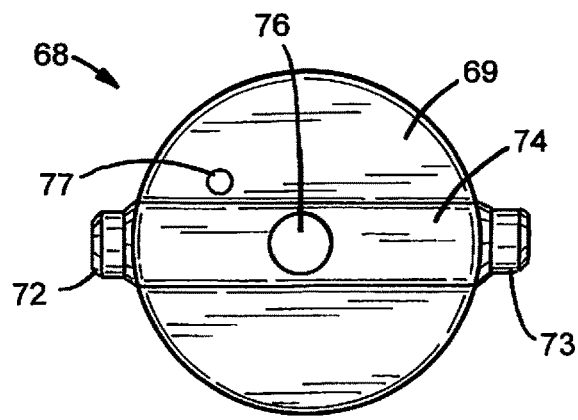
FIG. 21 is a front elevational view of the plug of FIG. 19.

Proceeding to FIGS. 19, 20 and 21, boss 51 accommodates a plug 68 to facilitate the assembly of mount device 48 on side wall 21 of bin 20. Plug 68 has a cylindrical body 69 including a cylindrical peripheral surface 71. Surface 71 is located in close contiguous relation to inside wall 56 of boss 51 to allow plug 68 to slide into passage 57 of boss 51. Projections or bosses 72 and 73 joined to opposite sides of body 69 are located in grooves 58 and 59. Hand grip 74 on body 69 is used to turn or rotate body 69, shown by arrow 75, to position bosses 72 and 73 into pockets 61 at the inner ends of grooves 58 and 59. Body 69 has a center hole to allow air to flow out of passage 57 when plug 68 is inserted into boss 51. An elongated flexible line 77 attached to body 68 is used to pull boss 51 from bin chamber 23 through hole 41 in side wall 21 of bin 20 during the assembly of mount device 48 on side wall 21 of bin 20.

Figure 9:
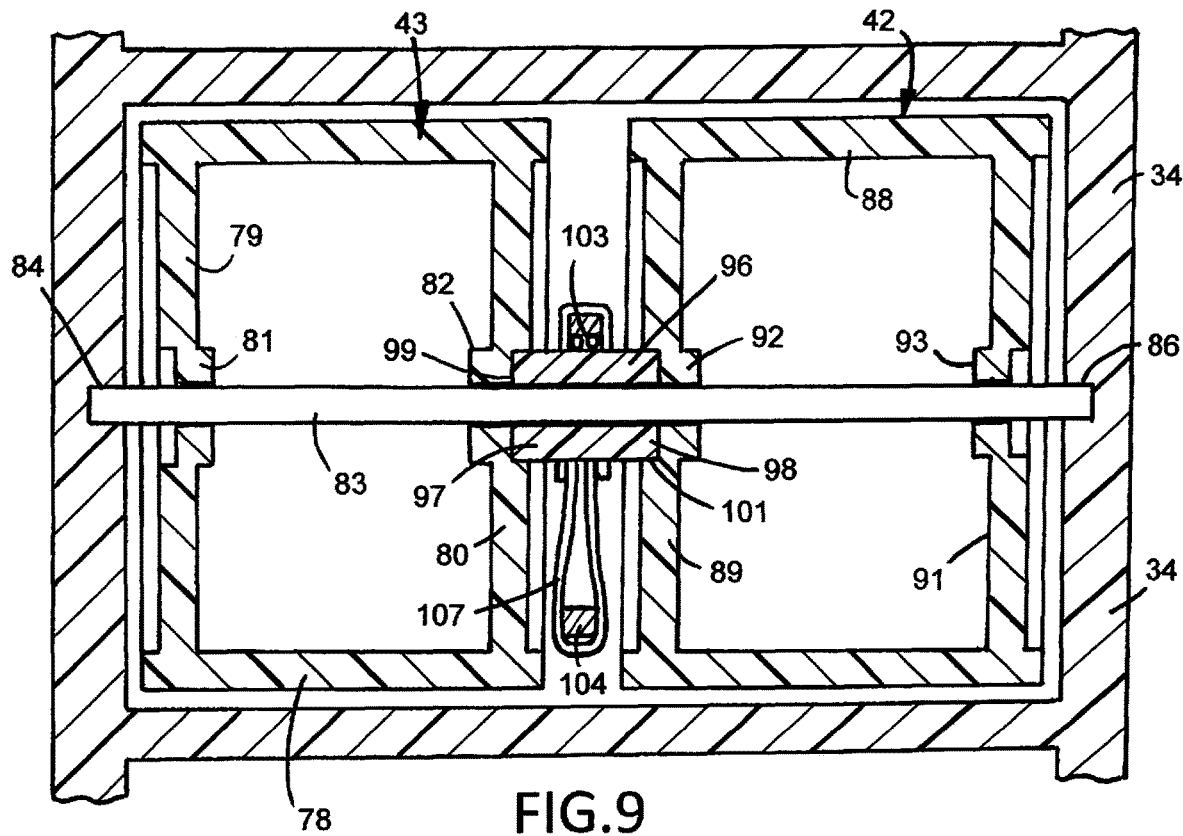
FIG. 9 is an enlarged sectional view taken along line 9-9 of FIG. 7.
Figure 10:
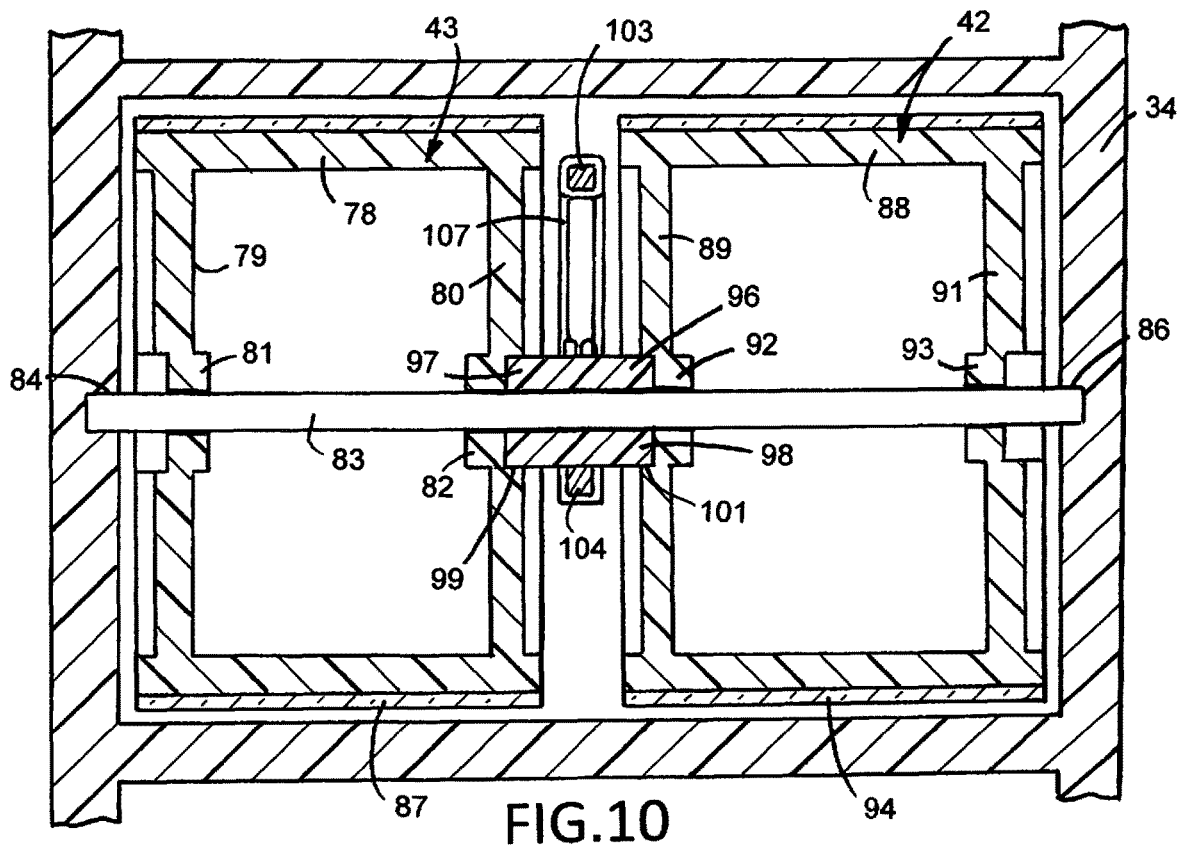
FIG. 10 is an enlarged sectional view taken along line 10-10 of FIG. 8.

Visual member 43, shown in FIGS. 7 and 8, has a continuous cylindrical wall 78. The peripheral surface of wall 78 is a dark color, such as black. A plurality of radial spokes 79 and 80 join wall 78 to hubs 81 and 82. An axle or rod 83 extends through openings in hubs 81 and 82 to rotatably mount visual member 43 on axle 83. As shown in FIGS. 9 and 10, the opposite ends of axle 83 fit into recesses 84 and 86 in housing 34 to attach axle 83 to housing 34. A bright colored tape 87, such as yellow, orange, red or green tape, is attached with an adhesive to one-half of cylindrical wall 78. Bright color paints and plastic coatings with light reflectors can be applied to one-half of cylindrical wall 78 as a replacement for colored tape 87. The remaining one-half of cylindrical wall 78 is a dark color, such as black or grey. Visual member 42 has the same structure as visual member 43. As shown in FIGS. 9 and 10, visual member 42 has a continuous cylindrical wall 88 joined to spokes 81 and 91. The inner portions of spokes 89 and 91 are joined to hubs 92 and 93 rotatably mounted on axle 83. A bright colored tape 94, such as yellow, orange, red or green tape, is attached with an adhesive to one-half of cylindrical wall 88. The color of tape 94 is the same color as tape 87.

A sleeve or spool 96 is interposed between visual members 42 and 43. Spool 96 rotatably mounted on axle 83 is a cylindrical member having an axial hole accommodating axle 83. Opposite ends of spool 96 has lugs 97 and 98 that fit into recesses 99 and 101 in hubs 82 and 92. Lugs 97 and 98 located in recesses 99 and 101 rotatably couple visual members 42 and 43 whereby rotation of spool 96 on axle 83 results in concurrent rotation of visual members 42 and 43.

Returning to FIGS. 7 and 8, motion transmitting apparatus 47 converts its pivotal or angular movements to rotational movement of spool 96 and visual members 42 and 43. Motion transmitting apparatus 47 has a yoke 102 comprising arms 103 and 104 and a tubular stem 106. Arms 103 and 104 are positioned adjacent opposite or top and bottom sides of spool 96. A continuous loop flexible cord 107, shown in FIGS. 11, 12 and 13, is located in grooves 108 and 109 in end portions of arms 104 and 104 to retain cord 107 on yoke 102. Cord 107 is a flexible endless band of plastic string material having middle sections 111 and 112 trained or wound around spool 96. As shown in FIG. 12, middle sections 111 and 112 wound around spool 96 are located between side sections 113 and 114 of cord 107. Endless cord 107 is biased into operable engagement with spool 96 by arms 103 and 104 of yoke 102. Middle sections 111 and 112 are turned around spool 96 a number of turns to adjust the overall operative length of cord 107 and bend arms 103 and 104 toward each other thereby subjecting cord 107 to a biasing force.

Figure 22:
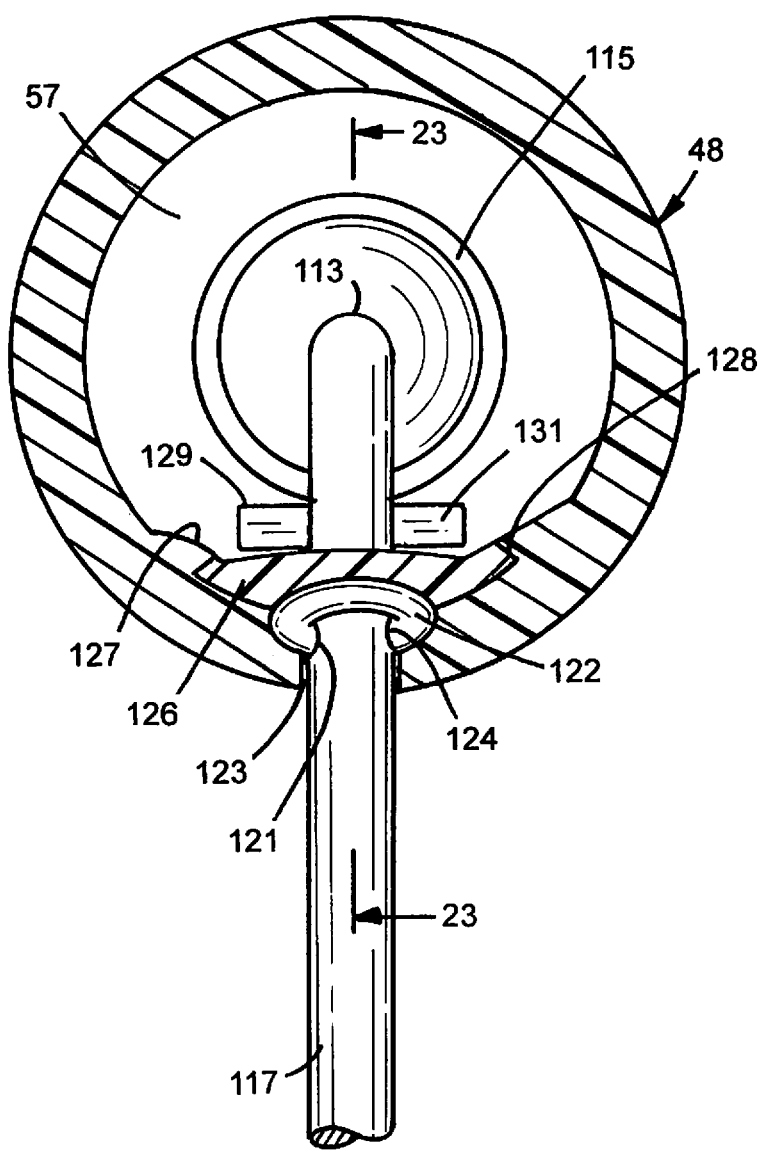
FIG. 22 is an enlarged sectional view taken along line 22-22 of FIG. 6.
Figure 25:
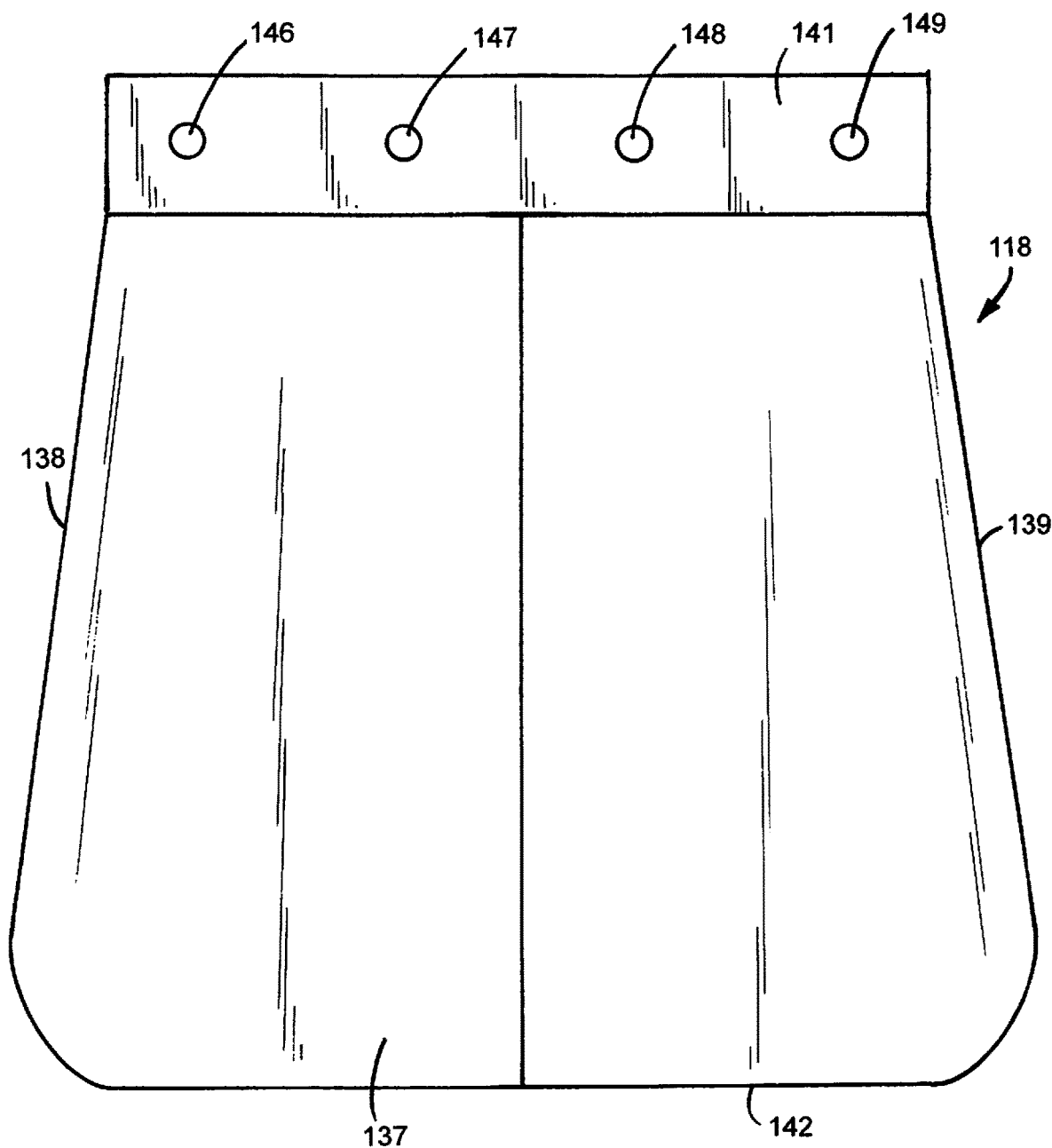
FIG. 25 is a front elevational view of the actuator of the material level indicator.
Figure 26:
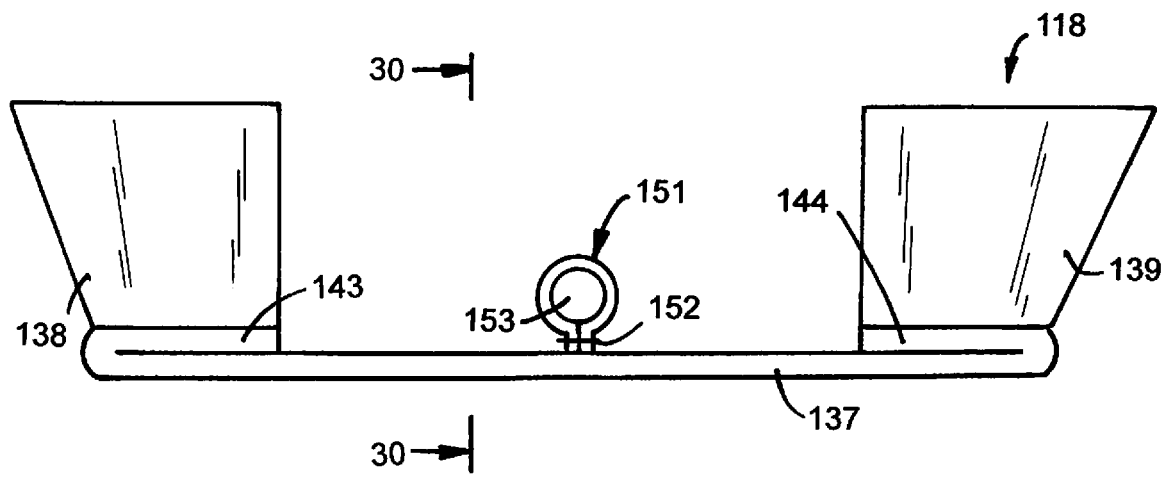
FIG. 26 is a top plan view of FIG. 25.
Figure 27:
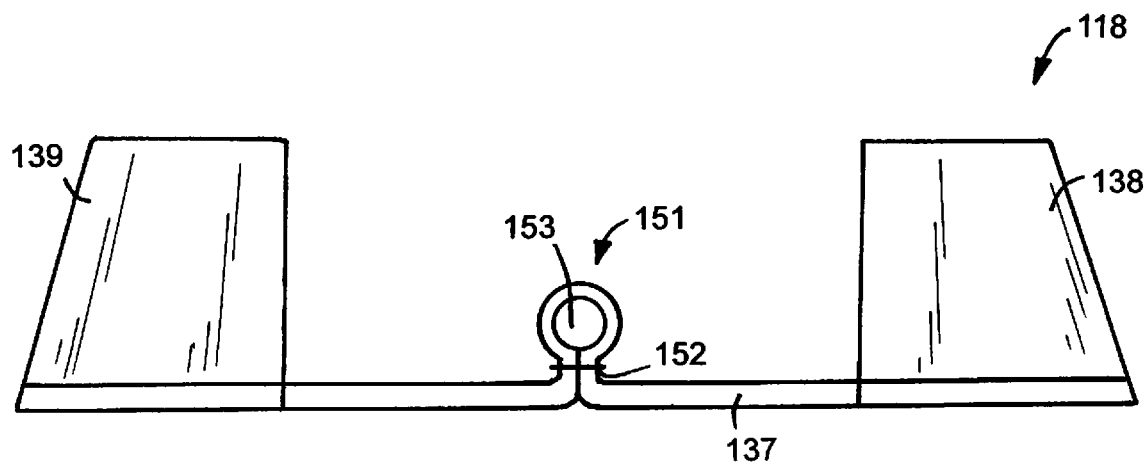
FIG. 27 is a bottom plan view of FIG. 25.
Figure 28:
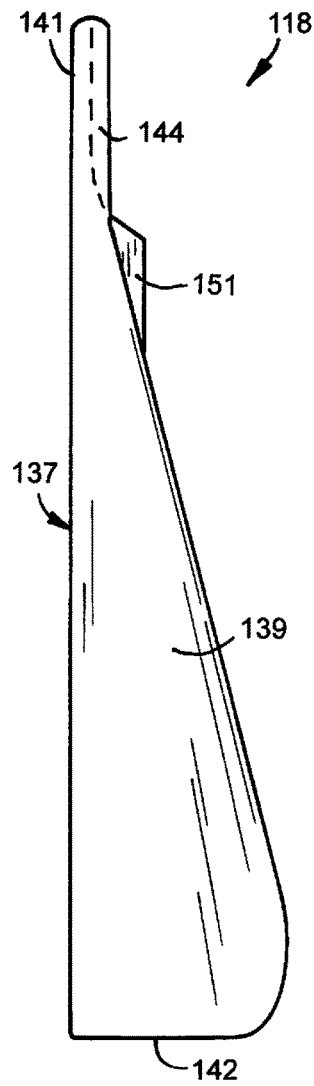
FIG. 28 is a right side elevational view of FIG. 25.
Figure 29:
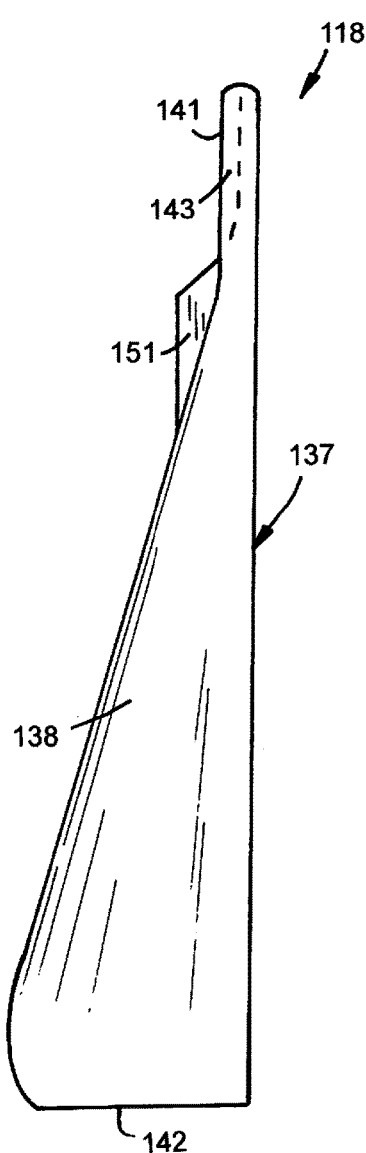
FIG. 29 is a left side elevational view of FIG. 25.
Figure 30:
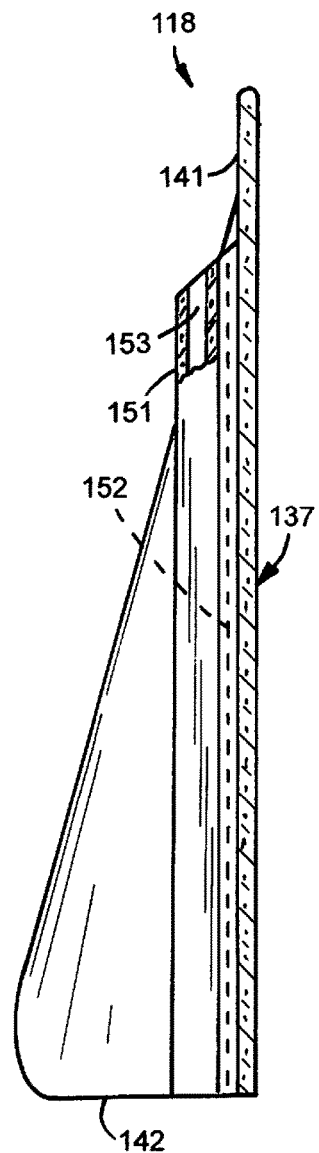
FIG. 30 is a sectional view taken along line 30-30 of FIG. 26.
Figure 31:
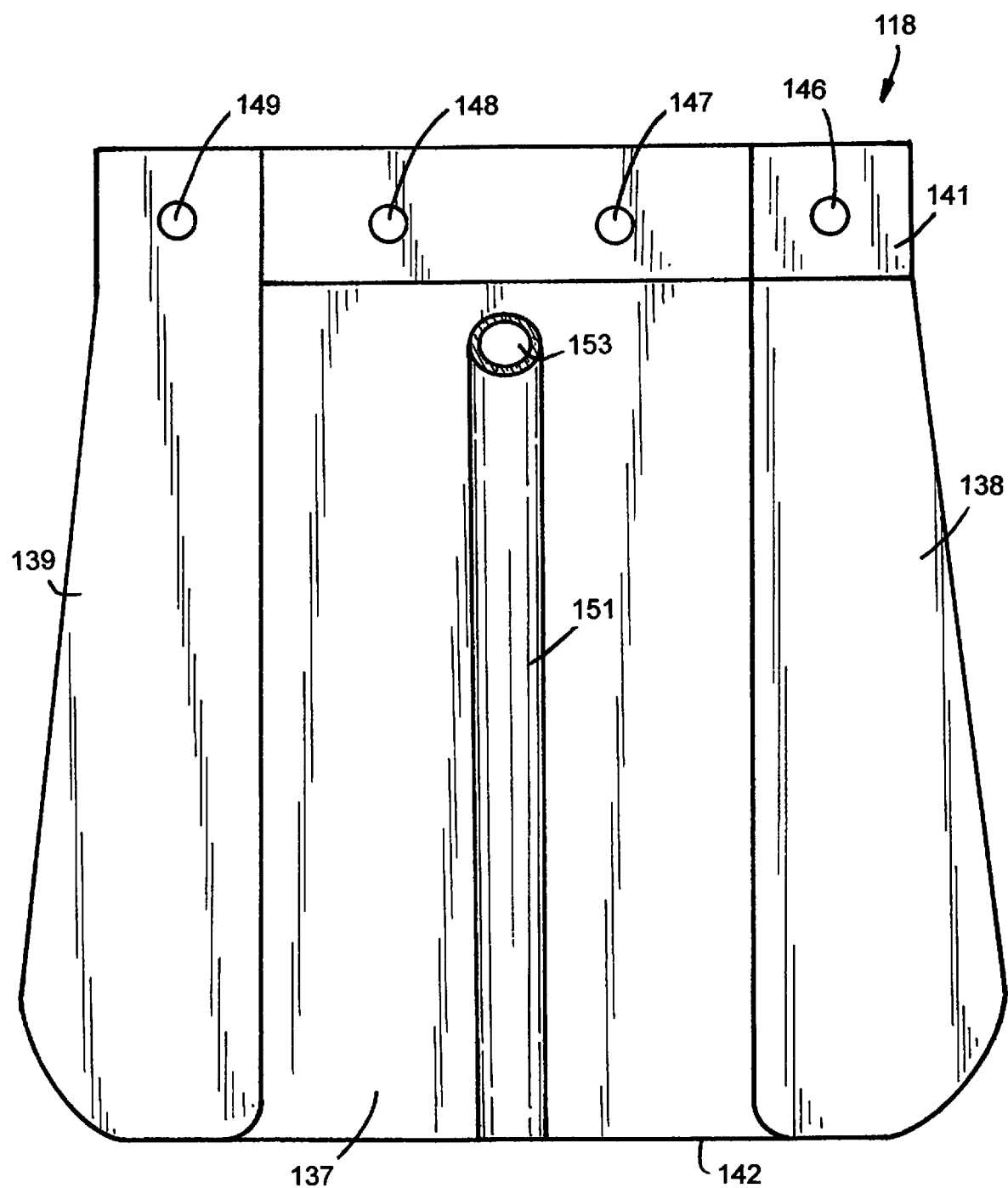
FIG. 31 is a rear elevational view of FIG. 25.

Stem 106 is an elongated member having a central passage 113 accommodating an actuator rod 114. The forward end of stem 106 has a bell-shaped mouth 115 open to passage 113 to facilitate the inserting of rod 114 into stem 106. Rod 114 is a one-piece, cylindrical, obtuse angled member having a first rod section 116 located within stem 106 and a second rod section 117 engageable with an actuator 118 located within chamber 23 of material storage bin 20. Rod 114, shown in FIG. 23, has an elbow 119 joining and retaining first and second rod sections 116 and 117 in a 120 degree obtuse angle. Second rod section 117 has a reduced diameter neck providing an annular groove 121 located below elbow 119. A torus or O-ring 122 is located in and around groove 121. As shown in FIG. 24, O-ring 122 is located in annular surface contact with rod section 117. O-ring 122 is a deformable elastic silicone rubber torus that seals opening 123 in mount device 48. Other elastic materials including plastics can be used to make O-ring 122. Returning to FIG. 22, mount device 48 has an annular pocket or shoulder 124 around opening 123 accommodating O-ring 122. A retainer 126 holds O-ring 122 in contact with shoulder 124. Retainer 126 is held on mount device 48 with a pair of ears 127 and 128 extended over opposite ends of retainer 126. Transverse projections 129 and 131 connected to rod section 117 above retainer 126 are stops limiting movement of rod section 117 through retainer 126 and O-ring 122 and positioning O-ring 122 in annular groove 121 when rod 114 is inserted through O-ring 122 and into actuator 117.

Figure 17:
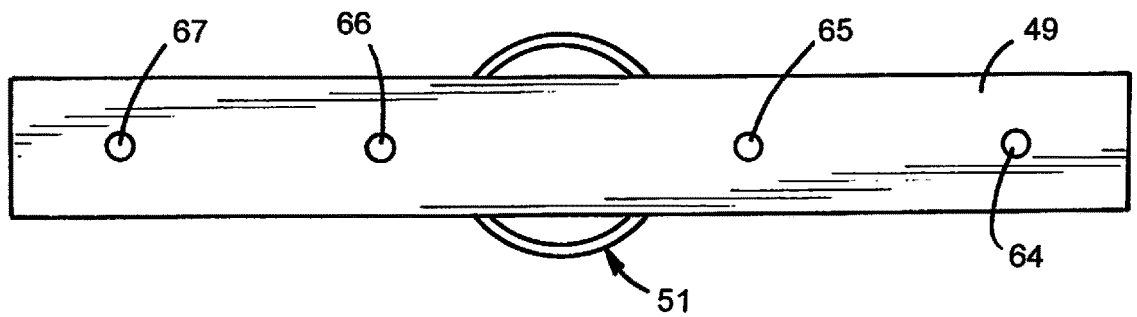
FIG. 17 is a rear elevational view of FIG. 16.

As shown in FIG. 6, actuator 118 is attached to the outside of bar 49 with a plate 132 and fasteners 133, 134, 135 and 136, such as bolts, screws and rivets. Fasteners 133 to 136 threaded into holes 64, 65, 66 and 67 in bar 49, illustrated in FIGS. 16 and 17, clamp the upper portion of actuator 118 with plate 132 to bar 49.

Actuator 118, shown in FIGS. 25 to 31, has a flexible body 137 of plastic, rubber or fabric material coated with antifriction material, such as Teflon. Body 137 has inward folded opposite sides 138 and 139 that taper outward from the top section 141 to the bottom edge 142 of body 137. The opposite sides 138 and 139 of body 137 curve inwardly away from the back side of body 137. The inward folded top portions 143 and 144, shown in FIG. 26, retain the curved shape of body sides 138 and 139. The top section 141 of body 137 has a plurality of holes 146, 147, 148 and 149 for accommodating fasteners 133, 134, 135 and 136. As shown in FIGS. 26, 27, 30 and 31, the middle section of the back or inside of body 137 has an upright tubular sleeve 151. Sleeve 151 extends to the bottom edge 142 of body 137. Body 137 is folded along an upright center line into middle side-by-side sections. The side-by-side sections are secured together with stitches 152 to provide sleeve 151 with an upright passage or opening 153 for accommodating rod section 117. The middle side-by-side sections of body 137 can be secured together with heat seals or an adhesive to provide tubular sleeve 151.

Returning to FIG. 7, yoke 102 is biased with a coil tension spring 154 to a first or down position wherein visual members 42 and 43 visually expose the dark color of lens 44. A plug 156 mounted on housing 34 anchors spring 154 on housing 34 and adjusts the tension force applied to yoke 102. When yoke 102 is in the first position rod 114 holds actuator 118 in a first position away from the inside of bin wall 21. Lower edge 142 of actuator body 137 extends upwardly and inwardly in bin chamber 23. Actuator 118 in the first position does not restrict the movement of material between actuator 118 and bin wall 21 downward as the level of material in bin chamber 23 decreases.

Moving to FIG. 8, when the level of material 24 in bin chamber 23 is at or above actuator 118, material 24 applies a force, shown by arrow 158, on actuator 118 which moves actuator 118 and rod 114 to a second position. The force of material 24 on actuator 118 overcomes the biasing force of spring 154 and swings rod 114 in a clockwise direction causing yoke 102 to move up to its second position whereby visual members 42 and 43 expose colored tapes 87 and 94 to lens 44 whereby the light color of tapes 87 and 94 are visible to a person remote from material storage bin 20. The person is informed that the material in bin chamber 23 is at or above the location of visual actuator 118.

Figures 14, 15:
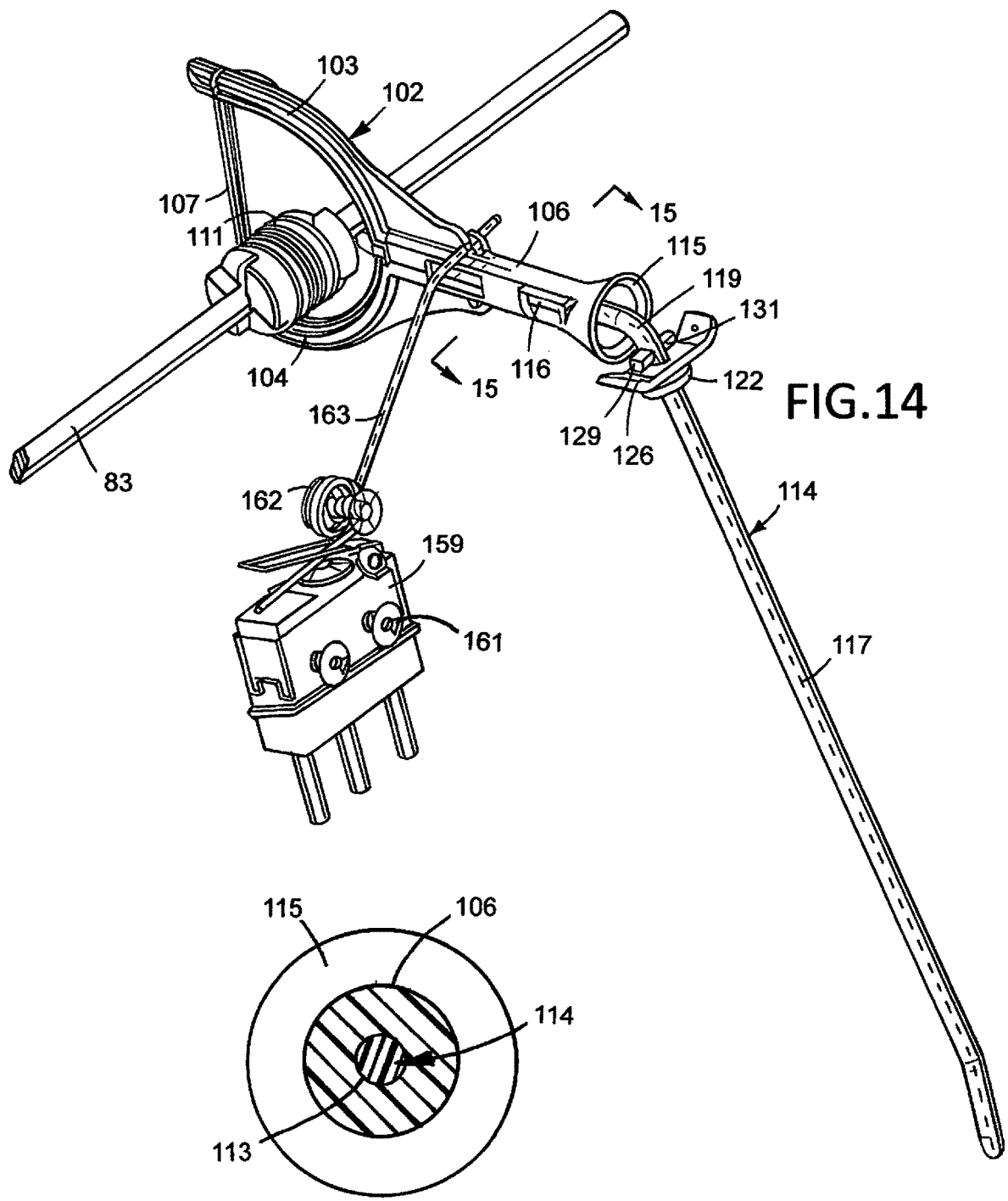
FIG. 14 is a perspective view of the motion transmission mechanism and electric switch operable to connect the material level indicator to a remote signal device to indicate the level of material in the material storage bin.
FIG. 15 is an enlarged sectional view taken along line 15-15 of FIG. 14.

A shown in FIG. 14, the visual indicator includes an ON-OFF switch 159 attached to housing 34 with screws 161. A coil spring 162 with an arm 163 coupled to yoke 102 actuates switch 159. When actuator 118 is in the second position, shown in FIG. 8, switch 159 is ON to provide an electric signal to a remote location indicating the level of material in bin chamber 23. The ON-OFF switch 159 is an optional structure to the visual bin material level indicator.

In use, as material 24 is deposited in chamber 23 of bin 20 adjacent actuator 118, the material applies pressure, shown by arrow 158 in FIG. 8, on actuator 118. Actuator 118 is moved toward the inside of side wall 21 forcing rod section 117 to move relative to O-ring 122 in a counter clockwise direction. O-ring 122 has elastic properties that allow O-ring 122 to compress during movement of rod 114. O-ring 122 remains in sealing relation with rod section 117 to prevent air, dust, dirt and particulates from flowing from bin chamber 23 in housing 34. First section 116 of rod 114 telescoped into stem 106 of yoke 102 angularly moves yoke 102 which in turn rotates visual members 42 and 43 to positions that expose colored tapes 87 and 94 to transparent lens 44. Colored tapes 87 and 94 are visible by remote person 31 thereby providing information regarding the level of material 24 in chamber 23 of bin 20. When the level of material 24 is below actuator 118, as shown in FIG. 7, spring 154 moves actuator 118 away from side wall 21 of bin 20. Visual members 42 and 43 are rotated to the dark NO positions. Person 31 remote from bin 20 can visually observe the bright color and dark color displays of material level indicators 26 to 29 shown in FIG. 1.

Material level indicator 26 can be mounted on side wall 21 of bin 20 during construction of the bin. Material level indicator 26 can also be mounted on an existing bin from the outside of bin side wall 21. Hole 41 is drilled in bin side wall 21 at a selected location with a power cutting tool. A plug 68, shown in FIGS. 19, 20 and 21, is inserted into chamber 57 of sleeve 51 with projections 72 and 73 aligned with grooves 58 and 59. Plug 68 is turned to lock projections 72 and 73 in lateral pockets 61. Actuator 118 is rolled into a generally cylindrical configuration around mount bar 49. Mount bar 49 and actuator 118 are moved through hole 41 into bin chamber 23. Cord 79 attached to rib 74 is used to pull boss 51 into hole 41. Nut 52 threaded onto boss 51 holds boss 51 on side wall 21 and bar 49 in engagement with the inside surface of bin side wall 21. Plug 68 is then removed from boss 51 by rotating plug 68 in a counter clockwise direction to align projections 72 and 73 with grooves 58 and 59. Plug 68 is then pulled off of sleeve 51. Second rod section 117 of rod 114 is inserted through O-ring 122 and into the entire passage 153 of tubular sleeve 151 of actuator 118. O-ring 122 is located around the neck 121 of section 117 of rod 114. Second rod section 117 of rod 114 extends to bottom edge 142 of actuator body 137, as shown in FIGS. 7 and 8. Housing 34 is mounted on boss 51 by inserting member 36 into chamber 57 of boss 51 with pegs or projections 37 and 38 aligned with grooves 58 and 59. Housing 34 is turned clockwise to position pegs 37 and 38 into pockets 61. Detent projections 62 retain pegs 37 and 38 in pockets 61. First rod section 116 of rod 114 is inserted into passage 113 of stem 106 of yoke 102 during the insertion of member 36 into chamber 57 of boss 51 to operatively connect motion transmission apparatus 47.

The foregoing disclosure of the invention describes and illustrates the material level indicator of the invention. Modifications, changes in parts and arrangement of parts and materials may be made to the material level indicator defined in the claims herein by persons skilled in the art without departing from the invention.

The invention claimed is:

1. A combined material storage bin and visual indicator for providing a person with information regarding the level of material located within the bin comprising:
    said bin having a side wall surrounding a chamber for holding material,
    said side wall having at least one hole open to the inside and outside of the side wall,
    said indicator mounted on the side wall operable to provide a person located remote from the bin with visual information regarding the level of material located within the bin,
    said indicator comprising
    a housing having an internal chamber,
    at least one visual member movably mounted on the housing, said visual member having a first portion and a second portion spaced from the first portion located in the internal chamber of the housing,
    a bright color on the first portion of the visual member,
    said second portion of the visual member having a dark color,
    a light transparent member joined to the housing enclosing the visual member within the interior chamber of the housing,
    a mount device connecting the housing to the side wall of the bin, said mount device including
    an elongated bar located within the bin engageable with the inside of the side wall of the bin,
    a boss joined to the bar extended through the hole in the side wall of the bin,
    a fastener cooperating with the boss to retain the bar in engagement with the inside of the side wall of the bin,
    an actuator connected to the mount device locatable within the chamber of the bin for movement from a first position to a second position and from the second position back to the first position,
    said actuator including a flexible body extended downwardly from the bar into the chamber of the bin,
    said flexible body comprising a flexible sheet member having opposite side portions extended toward the inside side wall of the bin, a top portion, a back wall adjacent the inside bin wall, and a bottom edge extended normal away from the inside side wall of the bin when the actuator is in the first position with material in the bin engaging the actuator, said bottom edge extending upwardly and inwardly away from the inside side wall of the bin when the actuator is in the second position with no material in the bin engaging the actuator, said back wall including a tubular portion having a vertical passage,
    a plate for holding the flexible sheet member on the bar,
    at least one fastener attaching the plate and flexible sheet member to the bar,
    a motion transmission apparatus connecting the actuator to the visual member,
    said motion transmission apparatus including a rod having a first rod section operatively associated with the visual member for rotating the visual member and a second rod section located in the passage of the tubular portion of the flexible sheet member,
    a torus mounted on the boss,
    said second rod section being extended through said torus with the torus in annular engagement with the second rod section thereby supporting the rod on the torus,
    an axle mounted on the housing rotatably supporting the visual member,
    a sleeve rotatably supported on the axle and connected to the visual member,
    a yoke having a stem, a first arm and a second arm,
    said first rod section being connected to the stem,
    said sleeve being located between said first and second arms,
    an endless flexible member having a middle portion wound around the sleeve, a first end portion retained on the first arm and a second end portion retained on the second arm whereby movement of the actuator between its first and second positions selectively moves the rod mounted on the torus, the yoke, and rotates the sleeve with the endless flexible member to rotate the visual member to position the bright color adjacent the transparent member or the dark color second portion of the visual member adjacent the transparent member whereby the bright color or the dark color second portion of the visual member is visible by a person located remote from the bin to provide the person with visual information concerning the level of material in the bin.

2. The combined material storage bin and visual indicator of claim 1 wherein:
    the tubular portion of the flexible sheet member of the actuator extends from adjacent the top portion to the bottom edge of the flexible sheet member, and
    said second rod section of the rod located in the passage of the tubular portion extends from adjacent the top portion to the bottom edge of the flexible sheet member of the actuator.

3. The combined material storage bin and visual indicator of claim 1 wherein:
the torus comprises a flexible O-ring retained on the boss,
said second rod section being extended through the O-ring with the O-ring in annular contact with the second rod section.

4. The combined material storage bin and visual indicator of claim 1 wherein:
the second rod section has an annual recess,
said torus being located in the annular recess in annular contact with the second rod section of the rod.

5. An indicator for providing information to a person regarding the level of material located within a bin comprising:
a housing having an internal chamber,
at least one visual member movably mounted on the housing, said visual member having a first portion and a second portion spaced from the first portion located in the internal chamber of the housing,
a bright color on the first portion of the visual member,
said second portion of the visual member having a dark color,
a light transparent member joined to the housing enclosing the visual member within the interior chamber of the housing,
a mount device for connecting the housing to the side wall of the bin, said mount device including
an elongated bar adapted to be located within the bin and engageable with the inside of the side wall of the bin,
a boss joined to the bar adapted to be extended through the hole in the side wall of the bin,
a fastener cooperating with the boss for retaining the bar in engagement with the inside of the side wall of the bin,
an actuator connected to the mount device locatable within the chamber of the bin for movement from a first position to a second position and from the second position back to the first position,
said actuator including a flexible body,
said flexible body comprising a flexible sheet member having opposite side portions adapted to extend toward the inside side wall of a top portion, a back wall and a bottom edge,
said back wall of the sheet member including a tubular portion having a passage,
a plate for holding the flexible sheet member on the bar,
at least one fastener attaching the plate and flexible sheet member to the bar,
a motion transmission apparatus connecting the actuator to the visual member,
said motion transmission apparatus including a rod having a first rod section operatively associated with the visual member for rotating the visual member and a second rod section located in the passage of the tubular portion of the flexible sheet member,
a torus mounted on the boss,
said second rod section being extended through said torus with the torus in annular engagement with the second rod section thereby supporting the rod on the torus,
an axle mounted on the housing rotatably supporting the visual member,
a sleeve rotatably supported on the axle and connected to the visual member,
a yoke having a stem, a first arm and a second arm,
said first rod section being connected to the stem,
said sleeve being located between said first and second arms,
an endless flexible member having a middle portion wound around the sleeve, a first end portion retained on the first arm and a second end portion retained on the second arm whereby movement of the actuator between its first and second positions selectively moves the rod mounted on the torus, the yoke, and rotates the sleeve with the endless flexible member to rotate the visual member to position the bright color adjacent the transparent member or the dark color second portion of the visual member adjacent the transparent member whereby the bright color or the dark color second portion of the visual member is visible by a person located remote from the bin to provide the person with visual information concerning the level of material in the bin.

6. The indicator of claim 5 wherein:
the tubular portion of the flexible sheet member of the actuator extends from adjacent the top portion of the bottom edge of the flexible sheet member, and
said second rod section of the rod located in the passage of the tubular portion extends from adjacent the top portion of the bottom edge of the flexible sheet member of the actuator.

7. The indicator of claim 5 wherein:
the torus comprises a flexible O-ring retained on the boss,
said second rod section being extended through the O-ring with the O-ring in annular contact with the second rod section.

8. The indicator of claim 5 wherein:
the second rod section has an annular recess,
said torus being located in the annular recess in annular contact with the second rod section of the rod.

9. An indicator for providing information to a person regarding the level of material located within a bin having an upright wall comprising:
a housing having an internal chamber,
a pair of generally cylindrical visual members having first portions and second portions spaced from the first portions,
a first color on the first portions of the visual members,
said second portions of the visual members having a second color,
said first and second colors being visually contrasting colors,
a light transparent member joined to the housing enclosing the visual members within the internal chamber of the housing,
a boss adapted to be mounted on the upright wall of the bin,
an actuator adapted to be located within the bin for movement from a first position to a second position and from the second position back to the first position,
a motion transmission apparatus connecting the actuator to the visual members,
said motion transmission apparatus having
a member for rotating the visual members,
a rod having a first section connected to the member and a second section connected to the actuator,
a torus mounted on the boss,
said second section of the rod extending through the torus to movably support the rod on the torus whereby movement of the actuator from a first position to a second position moves the visual members to locate the first color adjacent the transparent member and movement of the actuator from the second position to the first position moves the visual members to locate the second color of the visual members adjacent the transparent member whereby the first color and second color of the visual members are separate, visible by a person located remote from the bin to provide the person with information regarding the level of material in the bin.

10. The indicator of claim 9 wherein:
the torus is a flexible O-ring.

11. The indicator of claim 9 wherein:
the second section of the rod has an annular recess,
said torus including an inner annular surface located in the annular recess in annular engagement with the second section of the rod whereby the rod is movably supported on the torus.

12. An indicator for providing information to a person regarding the level of material located within a bin having an inside side wall and a chamber for holding the material comprising:
a housing having an internal chamber,
at least one visual member movably mounted on the housing,
said visual member having a first portion and a second portion spaced from the first portion located in the internal chamber of the housing,
a first color on the first portion of the visual member,
said second portion of the visual member having a second color,
said first color and second color being visually contrasting colors,
a light transparent member joined to the housing enclosing the visual member within the chamber of the housing,
an actuator locatable within the chamber of the bin for movement from a first position to a second position when engaged with material in the bin and from the second position to the first position when material in the bin does not engage the actuator,
said actuator including a flexible body and extended downwardly into the chamber of the bin,
said flexible body having a tubular member with a passage,
a bar adapted to be located within the bin and engageable with the upright inside wall of the bin,
a tubular boss connected to the bar,
a fastener attached to the boss adapted to hold the boss and bar on the bin,
a plate attached to the bar for securing the flexible body to the bar, and
a motion transmission apparatus operably connecting the actuator to the visual member,
said motion transmission apparatus including a rod mounted on the boss,
said rod having a rod section located in the passage of the tubular member whereby movement of the flexible body moves the rod and the actuator between its first and second positions selectively moving the visual member to locate the first color adjacent the light transparent member or the second color second portion of the visual member adjacent the transparent member whereby the first color or the second color second portion of the visual member is visible by a person located remote from the bin to provide the person with information concerning the level of material in the bin.

13. The indicator of claim 12 wherein:
the flexible body of the actuator is a flexible sheet member having opposite side portions adapted to extend toward the inside wall of the bin.

14. The indicator of claim 12 wherein:
the flexible body of the actuator is a flexible sheet member having opposite side portions extendable toward the inside wall of the bin, a top portion secured to the bar, a bottom edge, and said tubular member being located between the opposite side portions of the flexible sheet member and extended from adjacent the top portion to the bottom edge of the flexible sheet member.

15. The indicator of claim 14 wherein:
the rod section extends in the passage of the tubular member to the bottom edge of the sheet member.

16. The indicator of claim 12 wherein:
the actuator is a one-piece flexible sheet member including the tubular member with a passage accommodating the rod section of the motion transmitting apparatus.

17. The indicator of claim 16 wherein:
the one-piece flexible sheet member includes opposite side portions extendable toward the inside wall of the bin, a top portion secured to the bar, a bottom edge, said tubular member being located between the opposite side portions of the flexible sheet member and extended from adjacent the top portion to the bottom edge of the flexible sheet member.

18. The indicator of claim 17 wherein:
the rod section extends in the passage of the tubular member to the bottom edge of the sheet member.

19. The indicator of claim 12 including:
an O-ring mounted on the boss, and
said rod section of the rod extended through the O-ring to movably support the rod on the boss.

20. The indicator of claim 19 wherein:
said rod section of the rod has an annular recess, and said O-ring being located in the annular recess in annular contact with the rod section of the rod.

21. An indicator for providing information regarding the level of material located in a bin having a side wall and a chamber for holding the material comprising:
a housing having an internal chamber,
at least one visual member located within the internal chamber of the housing,
said visual member having a first portion and a second portion spaced from the first portion,
a first color on the first portion of the visual member,
said second portion of the visual member having a second color,
said first color and second color being visually contrasting colors,
a light transparent member joined to the housing enclosing the visual member within the chamber of the housing,
an actuator locatable within the chamber of the bin for movement from a first position to a second position by material in the bin and the second position to the first position,
a motion transmission apparatus operably connecting the actuator to the visual member operable to rotate the visual member in response to movement of the actuator by material in the bin,
said motion transmission apparatus including
a sleeve having an axial passage connected to the visual member,
an axle mounted on the housing extended through the passage of the sleeve for rotatably mounting the sleeve on the axle,
said visual member being rotatably mounted on the axle,
an endless flexible member,
said flexible member including a middle portion thereof wound around the sleeve, a first end portion and a second end portion,
a yoke having a first arm and a second arm located adjacent the sleeve,
said first end portion of the flexible member being retained on the second arm,
said second end portion of the endless flexible member being retained on the second arm,
a member connecting the yoke to the actuator and
said member, yoke and flexible member being movable in response to movement of the actuator to rotate the sleeve and visual member connected to the sleeve whereby the bright color and dark color second portion of the visual member are selectively located adjacent the transparent member and visible by a person located remote from the bin to provide the person with visual information concerning the level of material in the bin.

22. The indicator of claim 21 wherein:
the endless flexible member is an endless flexible cord.

* * * * *